(12) United States Patent
Yamashita et al.

(10) Patent No.: US 7,061,682 B2
(45) Date of Patent: Jun. 13, 2006

(54) METHOD OF FORMING A COLORED LAYER ON A MICROLENS SUBSTRATE, A MICROLENS SUBSTRATE, A TRANSMISSION SCREEN AND A REAR PROJECTION

(75) Inventors: Hideto Yamashita, Suwa (JP); Masafumi Sakaguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/859,474

(22) Filed: Jun. 2, 2004

(65) Prior Publication Data
US 2005/0168817 A1    Aug. 4, 2005

(30) Foreign Application Priority Data
Jun. 5, 2003    (JP) .............................. 2003-161295

(51) Int. Cl.
*G02B 27/10*    (2006.01)

(52) U.S. Cl. .................................... 359/619

(58) Field of Classification Search ........ 359/619–620, 359/742; 264/1.32, 2.5, 2.7
See application file for complete search history.

(56) References Cited

U.S. PATENT DOCUMENTS

| | | | |
|---|---|---|---|
| 6,384,970 B1 * | 5/2002 | Abe et al. ................... | 359/619 |
| 2002/0135883 A1 * | 9/2002 | Nishikawa et al. ......... | 359/619 |
| 2003/0081312 A1 * | 5/2003 | Nemoto et al. ............. | 264/1.32 |
| 2003/0142242 A1 * | 7/2003 | Yoon et al. ................. | 348/744 |
| 2004/0080005 A1 * | 4/2004 | Yamamoto .................. | 359/619 |

FOREIGN PATENT DOCUMENTS

| | | |
|---|---|---|
| JP | 2001-039737 | 2/2001 |
| JP | 2001-305315 | 10/2001 |
| JP | 2001-341210 | 12/2001 |

* cited by examiner

*Primary Examiner*—Alicia M Harrington
(74) *Attorney, Agent, or Firm*—Harness, Dickey & Pierce, P.L.C.

(57) ABSTRACT

In a method of forming a colored layer on a microlens substrate according to the present invention, a colored layer 4 is formed on troughs 32 between adjacent microlenses 3 by applying a liquid 42 for forming a colored layer 4 with fluidity onto the side of the microlens substrate 1 where the microlenses 3 are provided, and then hardening the applied liquid 42 to form a colored layer 4 in the troughs 32. A colored dispersion liquid in which a dispersoid is dispersed in a dispersion medium is suitably used as the liquid 42. It is preferable that the liquid 42 for forming a colored layer 4 has a coefficient of viscosity of 500 cP or less at a temperature of 25° C.

16 Claims, 13 Drawing Sheets

(c)

(d)

(g)

(h)

METHOD OF FORMING A COLORED LAYER ON A MICROLENS SUBSTRATE, A MICROLENS SUBSTRATE, A TRANSMISSION SCREEN AND A REAR PROJECTION

FIELD OF THE INVENTION

The present invention relates to a method of forming a colored layer on a microlens substrate, a microlens substrate, a transmission screen, and a rear projection.

BACKGROUND OF THE INVENTION

Displays for projecting an image on a screen thereof are known. Rear projections applied to a monitor for a home theater, a large screen television, or the like are known as such the display.

A rear projection having a microlens substrate with a plurality of microlenses (i.e., microlens substrate) is known as such a rear projection. The rear projection having the microlens substrate has an advantage to obtain fine view angle characteristics in both vertical and lateral directions of the screen by means of light reflection of the microlenses.

Further, in the devices with the microlens substrate, a black matrix (a shield layer) is normally formed on the microlens substrate in order to improve the contrast and to prevent a lowering of visibility, uneven display, blur of an image, or the like.

Formation of the black matrix is normally carried out by means of a wet etching process using a resist. Namely, a thin film is formed on a surface opposite to the surface of the microlens substrate on which the microlenses are provided by means of Chemical Vapor Deposition method (CVD method), and a resist layer with a pattern of openings (i.e., a portion other than the portion on which the black matrix is formed in the thin film) is formed on the thin film. Then, the openings are formed on the thin film by the wet etching process, and then the black matrix is formed by removing the resist layer.

However, such a method has a defect of less productivity due to many processes (or many steps). Further, since alignment is indispensable for such a method, it is difficult to apply the method to a relatively large-sized microlens substrate as used for a rear projection. A plurality of relatively small-sized microlens substrates may be used in combination for a rear projection or the like. In this case, there is a problem that seams of bonding of the microlens substrates appear on a projected image.

SUMMARY OF THE INVENTION

It is one object of the present invention to provide a method of forming a colored layer in a plurality of troughs formed between adjacent microlenses of a microlens substrate, which has a plurality of microlenses and the plurality of troughs, with high productivity and accurately. Further, it is another object of the present invention to provide a microlens substrate on which a colored layer is accurately provided with high productivity. Moreover, it is still another object of the present invention to provide a transmission screen and a rear projection provided with the microlens substrate.

In order to achieve the above objects, in one aspect of the present invention, the present invention is directed to a method of forming a colored layer on a microlens substrate. The method comprises the steps of:

applying colored liquid having fluidity onto the side of the microlens substrate where a plurality of microlenses and a plurality of troughs formed between adjacent microlenses are provided; and hardening the applied liquid to form a colored layer in the troughs.

This makes it possible to provide a microlens substrate on which a colored layer is accurately provided with high productivity.

In the method of forming a colored layer of the present invention, it is preferable that the liquid has a coefficient of viscosity of 500 cP or less at a temperature of 25° C.

This makes it possible to further enhance efficiency of formation of the colored layer.

In the method of forming a colored layer of the present invention, it is preferable that a contact angle of the liquid to the microlens substrate is less than 90° during the application of the liquid.

This makes it possible to further enhance efficiency of formation of the colored layer and to improve adhesion between the colored layer and the microlens substrate.

In the method of forming a colored layer of the present invention, it is preferable that the liquid has a predetermined optical density for light having a predetermined wavelength, and the optical density of the liquid is higher than that of each of the microlenses when the wavelength of the light is 587.56 nm.

This makes it possible to enhance a function of absorbing outer light of the formed colored layer relatively easily.

In the method of forming a colored layer of the present invention, it is preferable that each of the microlenses has an effective lens region, and the method further comprising the step of:

removing the liquid or the solid of the liquid adhering to portions corresponding to the effective lens regions of the microlenses.

This makes it possible to enhance the usability of light on the microlenses, whereby the microlens substrate can output light with higher luminance.

In the method of forming a colored layer of the present invention, it is preferable that the liquid is applied to the microlens substrate by means of a spray method.

This makes it possible to further enhance efficiency of formation of the colored layer.

In the method of forming a colored layer of the present invention, it is preferable that the liquid is in the form of a solution containing a solvent or a dispersion liquid containing a dispersion medium wherein the hardening of the liquid is carried out by removing the solvent or the dispersion medium from the liquid.

This makes it possible to further enhance efficiency of formation of the colored layer.

In this case, in the method of forming a colored layer of the present invention, it is preferable that at least one pigment is dispersed in the dispersion medium of the dispersion liquid.

This makes it possible to further enhance efficiency of formation of the colored layer.

In the method of forming a colored layer of the present invention, it is preferable that an average grain diameter of the pigment is in the range of 0.03 to 20 μm.

This makes it possible to further enhance efficiency of formation of the colored layer and to improve adhesion between the colored layer and the microlens substrate.

In the method of forming a colored layer of the present invention, it is preferable that the plurality of microlenses are arranged on the microlens substrate in an optically random order.

In this way, in the present invention, it is possible to form a colored layer efficiently even on the microlens substrate on which microlenses are randomly formed, to which it is difficult to apply a conventional method of forming a colored layer. Further, in the case where the microlens substrate on which the microlenses are randomly formed is applied to, for example, a transmission screen, it is possible to prevent occurrence of an interference pattern such as so-called moire more effectively.

In the method of forming a colored layer of the present invention, it is preferable that the colored layer has a function of improving the contrast when light is entered into the microlens substrate.

This makes the projected image, which is projected by means of a transmission screen, projector or the like manufactured using the microlens substrate, more excellent (or finer).

In another aspect of the present invention, the present invention is directed to a microlens substrate having a colored layer thereon. The colored layer is formed by means of a method of forming the colored layer on the microlens substrate. The method comprises the steps of:

applying colored liquid having fluidity onto the side of the microlens substrate where a plurality of microlenses and a plurality of troughs formed between adjacent microlenses are provided; and hardening the applied liquid to form a colored layer in the troughs.

This makes it possible to provide a microlens substrate on which a colored layer is accurately provided.

In yet another aspect of the present invention, the present invention is directed to a transmission screen comprising a microlens substrate. The microlens substrate has a colored layer thereon, and the colored layer is formed by means of a method of forming the colored layer on the microlens substrate. The method comprises the steps of:

applying colored liquid having fluidity onto the side of the microlens substrate where a plurality of microlenses and a plurality of troughs formed between adjacent microlenses are provided; and hardening the applied liquid to form a colored layer in the troughs.

This makes it possible to provide a transmission screen having a microlens substrate on which a colored layer is accurately provided with high productivity.

It is preferable that the transmission screen of the present invention further comprises a Fresnel lens portion with a Fresnel lens, the Fresnel lens portion having an emission face and the Fresnel lens being formed in the emission face wherein the microlens substrate is arranged on the emission face side of the Fresnel lens portion.

This makes it possible to make a proper viewing angle range adjacent to a screen.

In the transmission screen of the present invention, it is preferable that the diameter of each of the microlenses is in the range of 10 to 500 μm.

This makes it possible to enhance the productivity of the transmission screen while maintaining sufficient resolution in the image projected on the screen.

In still another aspect of the present invention, the present invention is directed to a rear projection comprising a transmission screen. The transmission screen comprises a microlens substrate. The microlens substrate has a colored layer thereon, and the colored layer is formed by means of a method of forming the colored layer on the microlens substrate. The method comprises the steps of:

applying colored liquid having fluidity onto the side of the microlens substrate where a plurality of microlenses and a plurality of troughs formed between adjacent microlenses are provided; and hardening the applied liquid to form a colored layer in the troughs.

This makes it possible to provide a rear projection having a microlens substrate on which a colored layer is accurately provided with high productivity.

It is preferable that the rear projection of the present invention further comprises:

a projection optical unit; and a light guiding mirror.

This makes it possible to provide a rear projection having a microlens substrate on which a colored layer is accurately provided with high productivity.

BRIEF DESCRIPTION OF THE DRAWINGS

The foregoing and other objects, features and advantages of the invention will become more readily apparent from the following detailed description of preferred embodiments of the invention which proceeds with reference to the accompanying drawings.

PREFERRED EMBODIMENTS OF THE INVENTION

Figure 1:
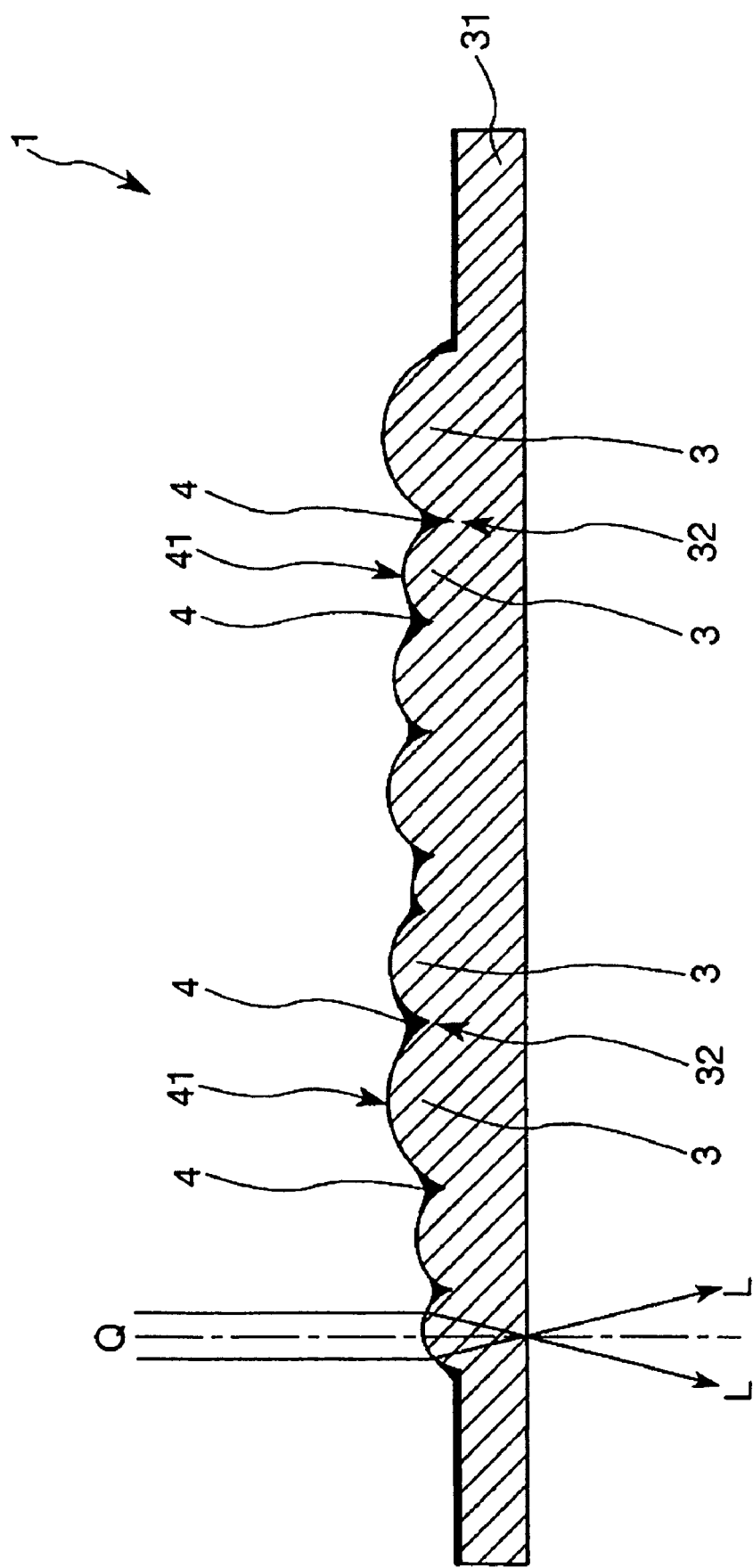
FIG. 1 is a schematic longitudinal cross-sectional view showing a microlens substrate of the present invention.
Figure 2:
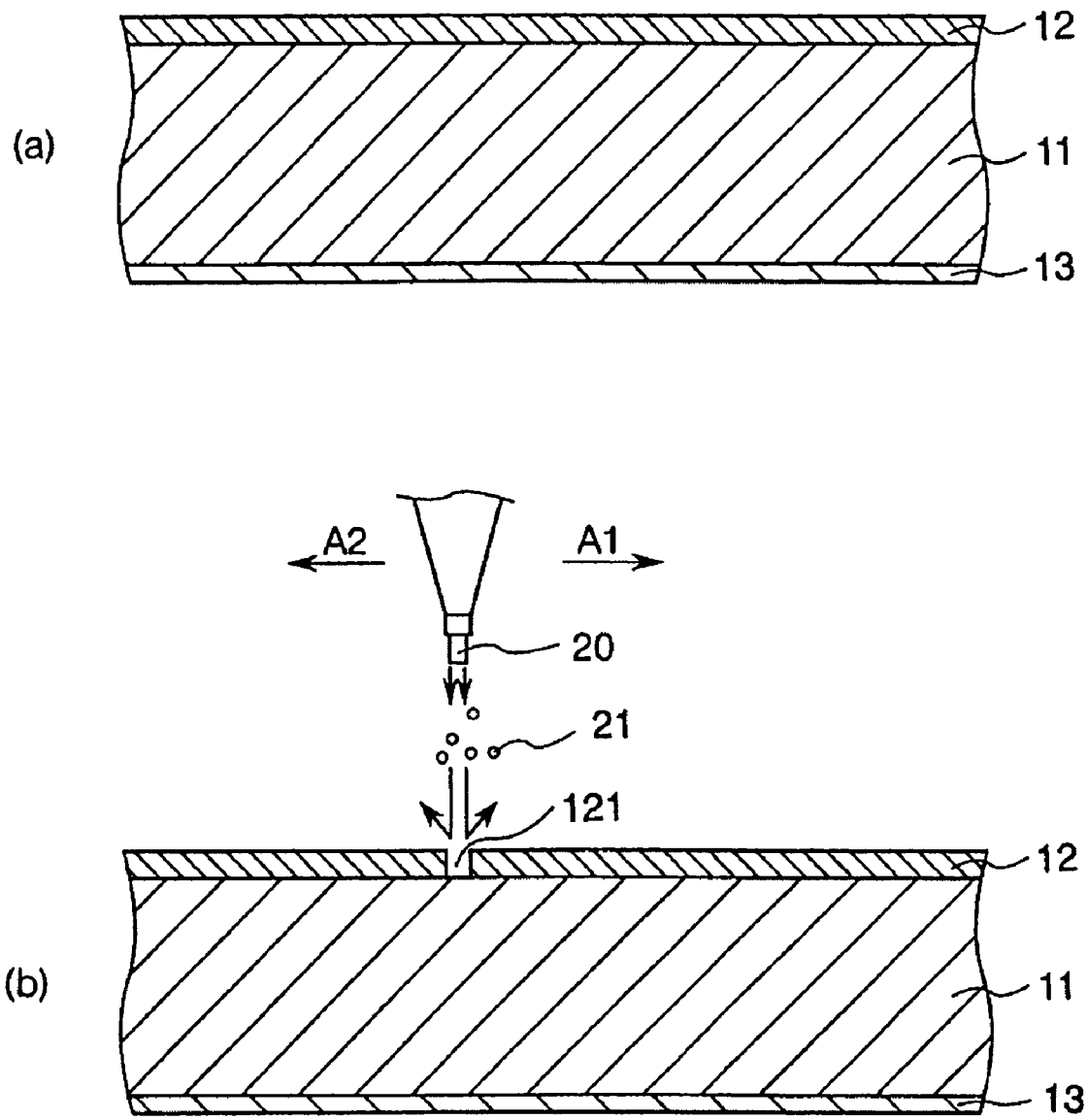
FIG. 2 is a schematic longitudinal cross-sectional view showing a method of manufacturing the substrate with concave portions for microlenses.
Figure 3:
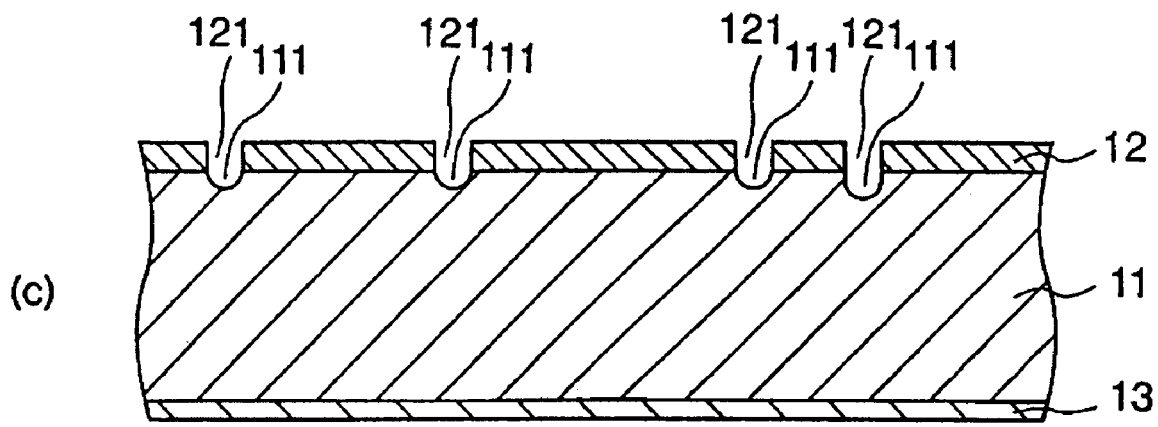
FIG. 3 is a schematic longitudinal cross-sectional view showing a method of manufacturing the substrate with concave portions for microlenses.
Figure 3:
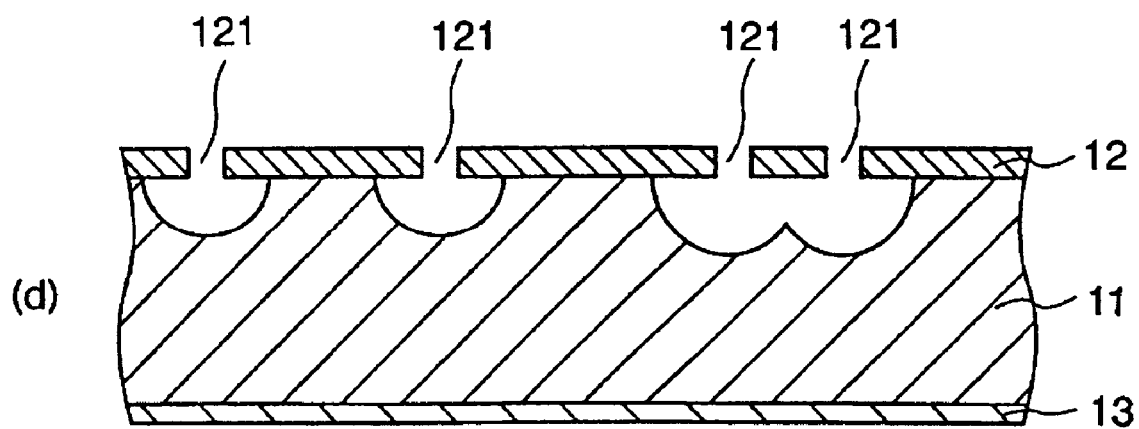
Figure 4:
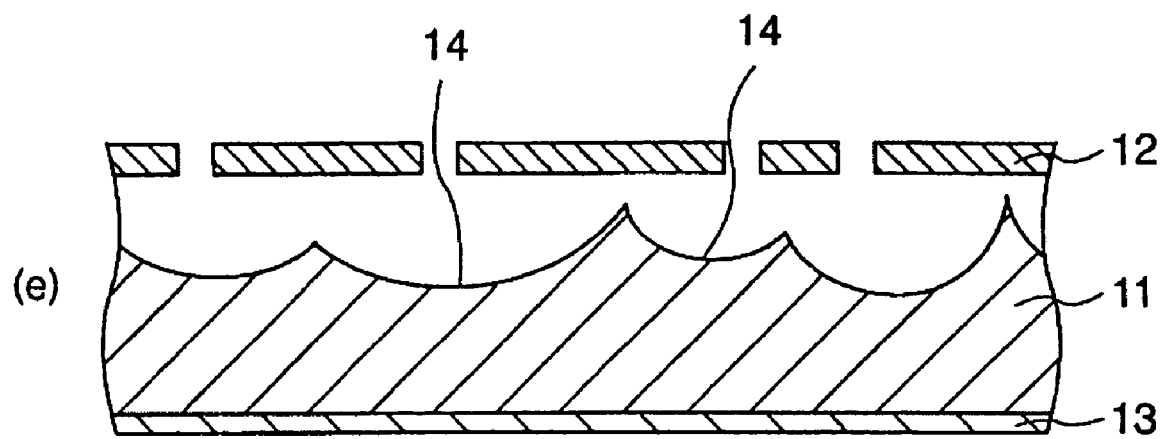
FIG. 4 is a schematic longitudinal cross-sectional view showing a method of manufacturing the substrate with concave portions for microlenses.
Figure 5:
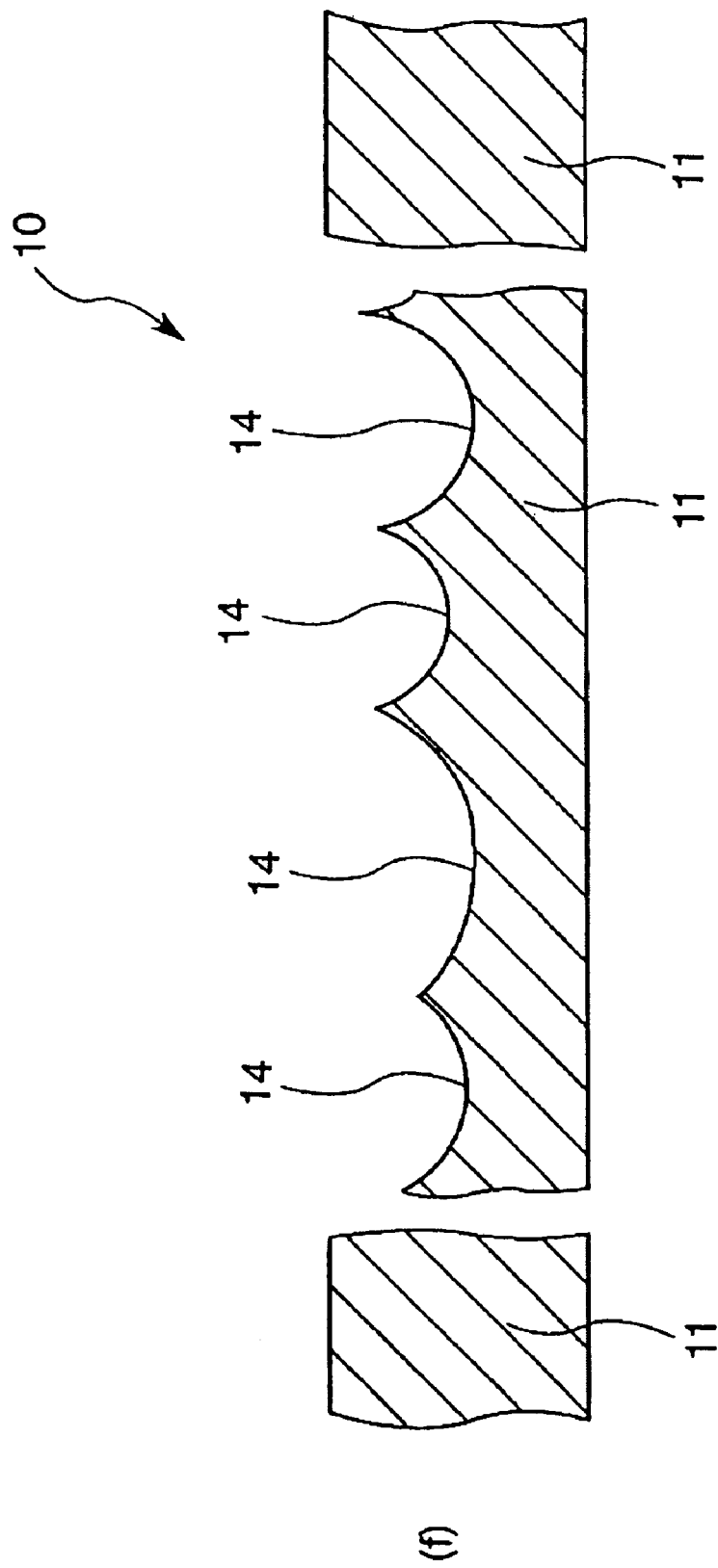
FIG. 5 is a schematic longitudinal cross-sectional view showing a method of manufacturing the substrate with concave portions for microlenses.
Figure 6:
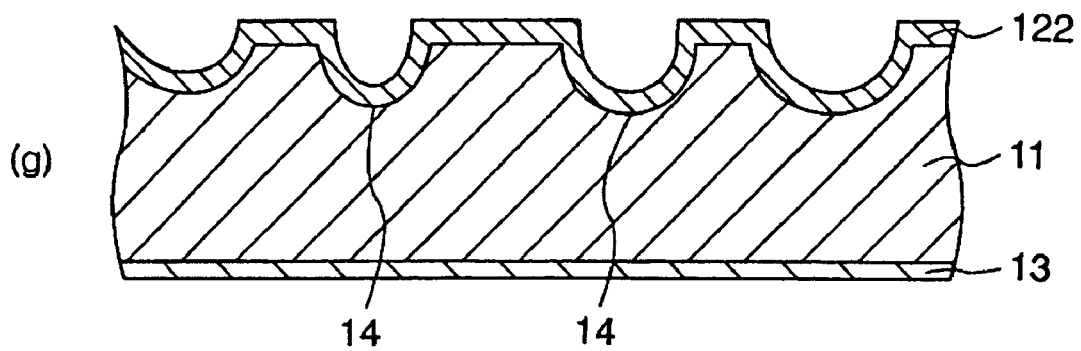
FIG. 6 is a schematic longitudinal cross-sectional view showing a method of manufacturing the substrate with concave portions for microlenses.
Figure 6:
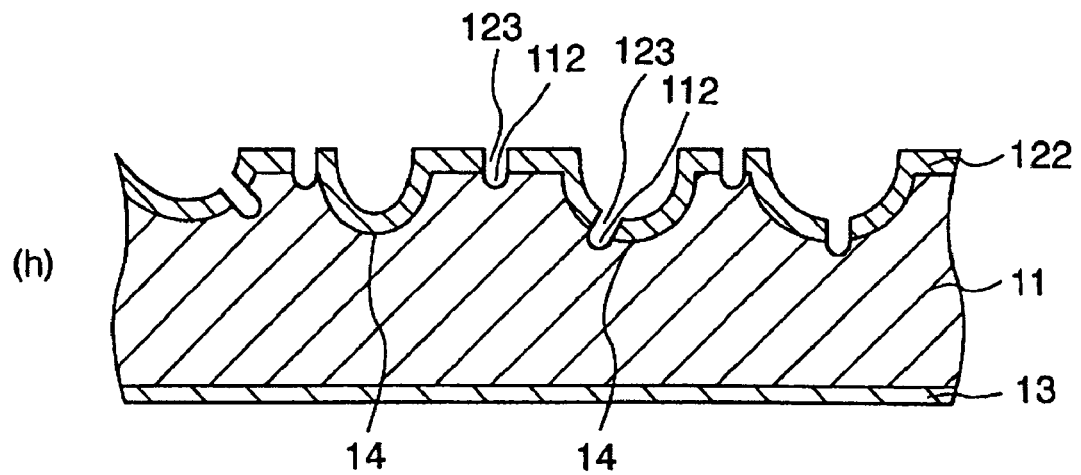
Figure 7:
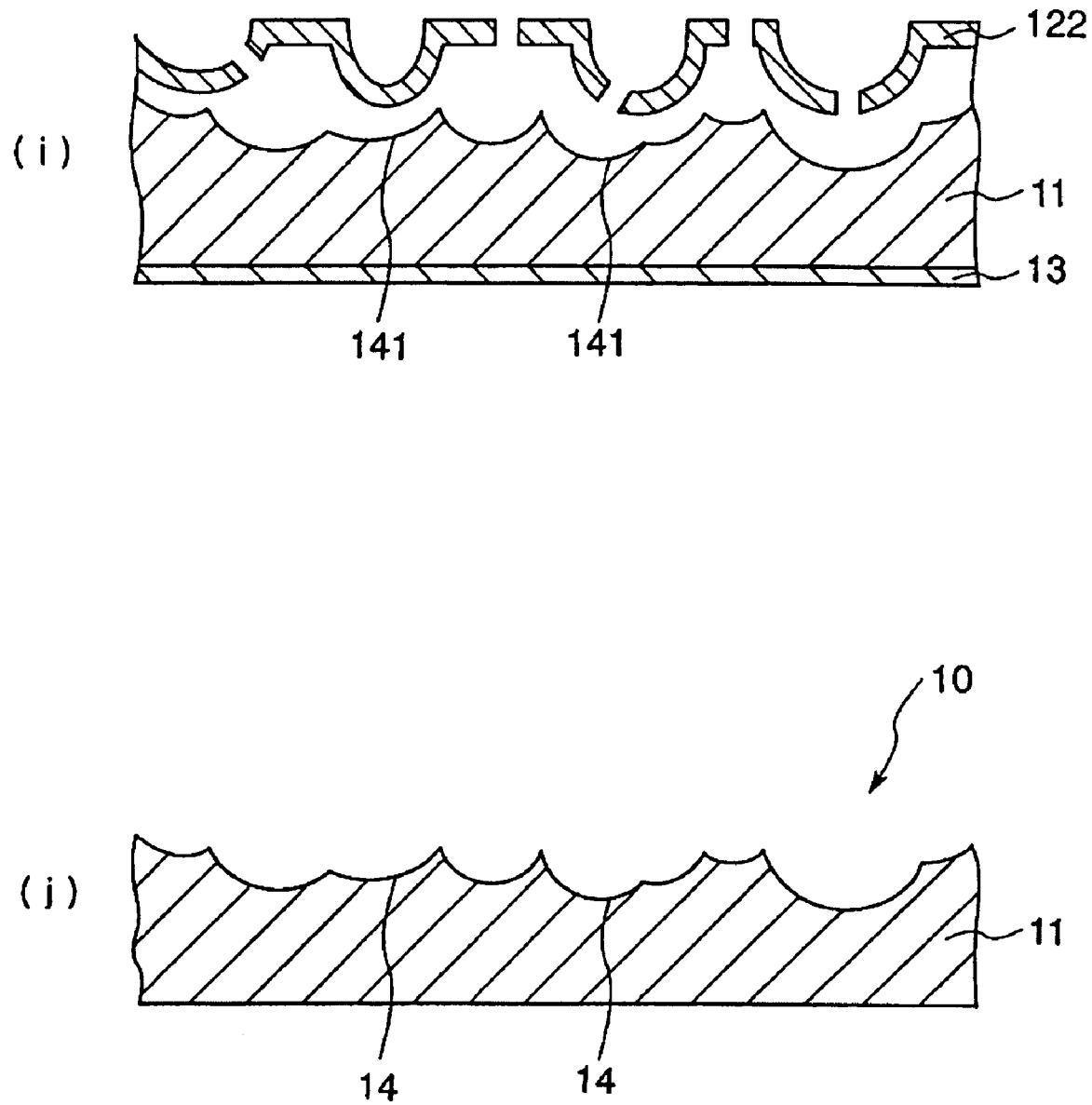
FIG. 7 is a schematic longitudinal cross-sectional view showing a method of manufacturing the substrate with concave portions for microlenses.
Figure 8:
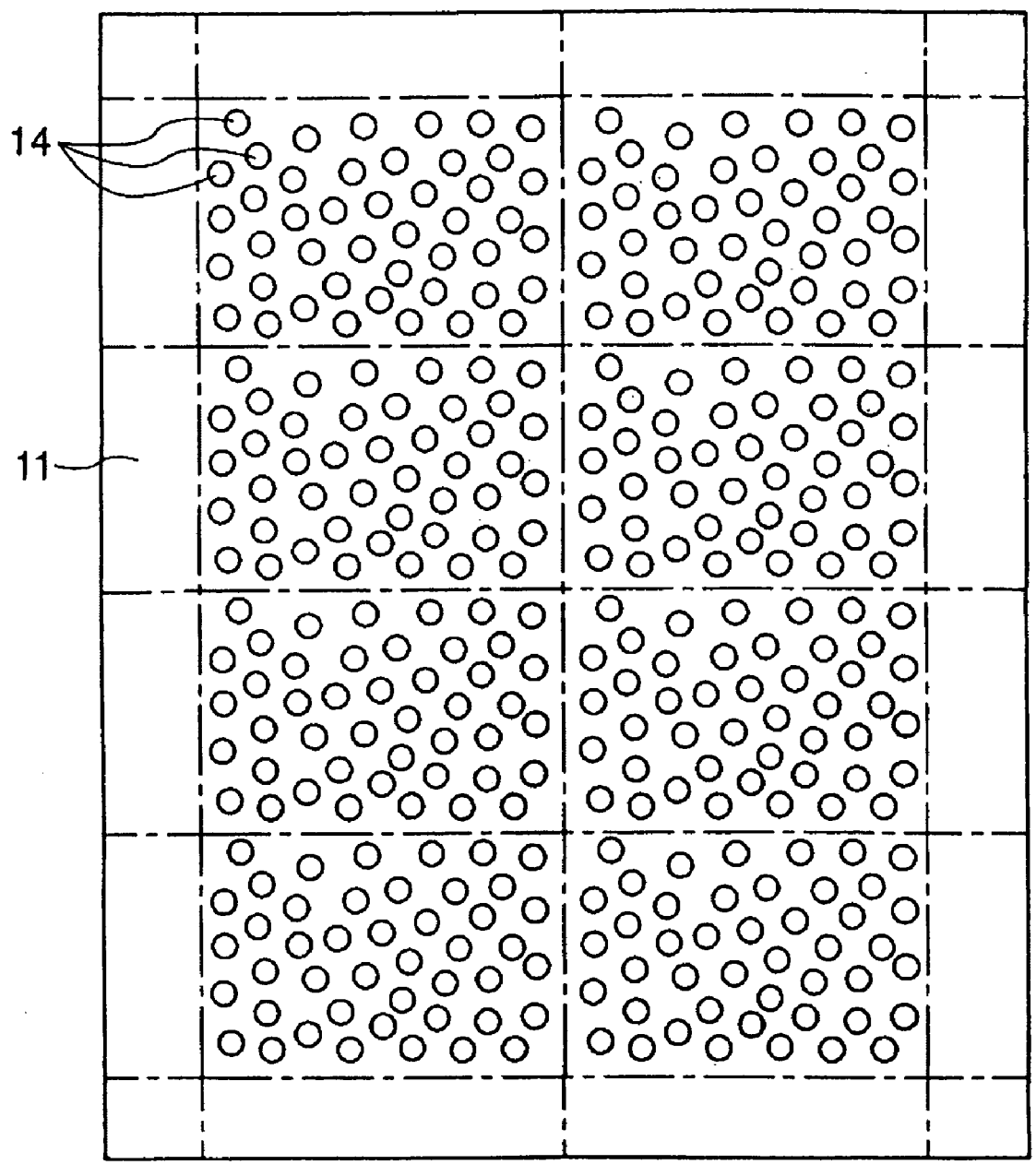
FIG. 8 is a schematic plan view showing a substrate with concave portions for microlenses.
Figure 9:
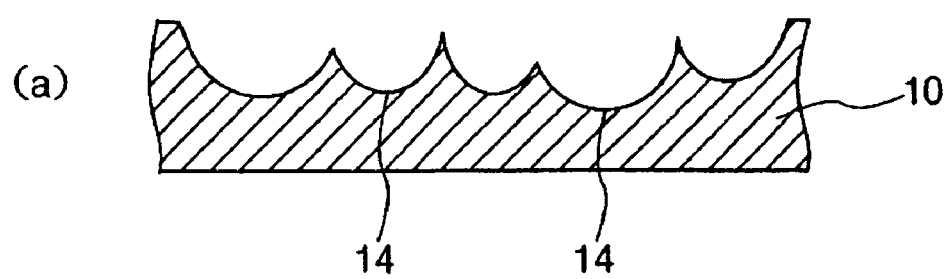
FIG. 9 is a schematic longitudinal cross-sectional view showing a method of manufacturing a microlens substrate of the present invention.
Figure 9:
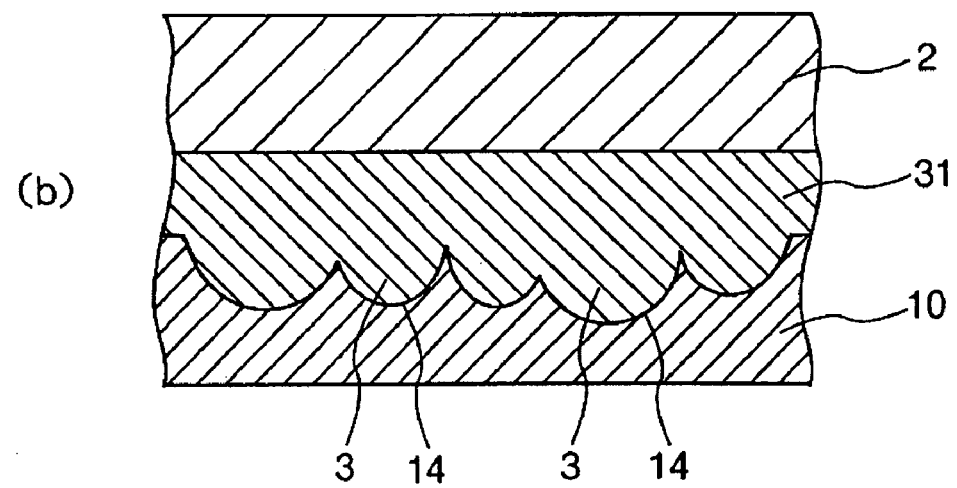
Figure 9:
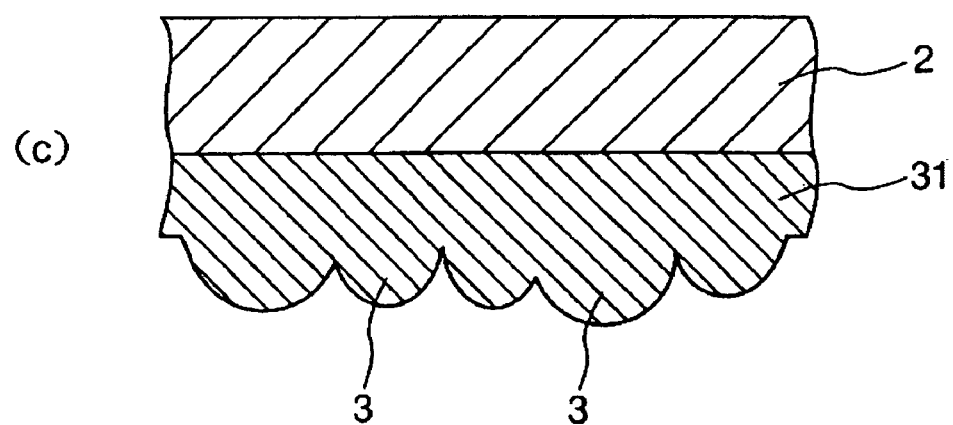
Figure 10:
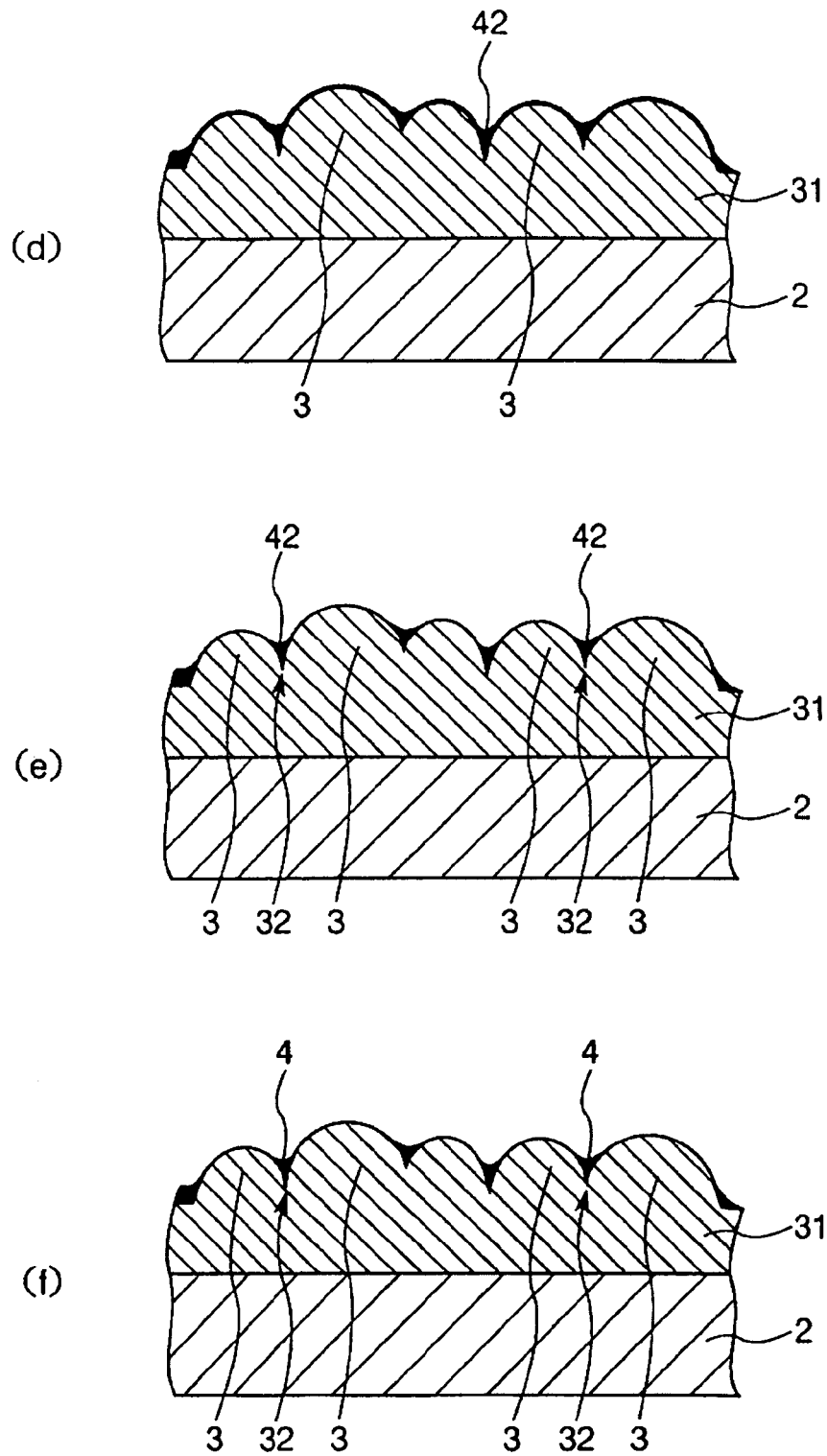
FIG. 10 is a schematic longitudinal cross-sectional view showing a method of manufacturing the microlens substrate of the present invention.

A detailed description of the preferred embodiments according to the present invention will now be made with reference to the accompanying drawings FIG. 1 is a schematic longitudinal cross-sectional view showing a microlens substrate of the present invention. FIGS. 2–7 are schematic longitudinal cross-sectional views each showing a method of manufacturing the substrate with concave portions for microlenses. FIG. 8 is a schematic plan view showing a substrate with concave portions for microlenses. FIGS. 9 and 10 are schematic longitudinal cross-sectional views each showing a method of manufacturing a microlens substrate of the present invention.

As shown in FIG. 1, a microlens substrate 1 has a plurality of microlenses 3 constituted from a resin layer 31, and a colored layer 4 formed in troughs 32 provided between adjacent microlenses 3.

The plurality of microlenses 3 are randomly arranged on the microlens substrate 1, but the present invention is not limited to this structure. The microlenses 3 may be regularly arranged on the microlens substrate 1. In the case where the microlens substrate 1 is used for a screen or rear projection described later, for example, it is preferable that the microlenses 3 are randomly arranged on the microlens substrate 1. This makes it possible to prevent occurrence of an interference pattern such as so-called moire, for example, effectively.

The microlens substrate 1 of the present invention has a feature that a colored layer 4 having a function of absorbing outer light (i.e., a function of absorbing incident light) is provided so as to correspond to troughs 32 formed between adjacent microlenses 3.

Openings 41 that are not covered by the colored layer 4 substantially correspond with effective lens regions of the microlenses 3. Thus, an optical axis Q of the microlenses 3 passes through the opening 41 that is not covered by the colored layer 4. Therefore, in the microlens substrate 1, incident light L entered from the face opposite to the colored layer 4 passes through the openings 41 and enters to the microlenses 3, thereby being focused and diffused by the microlenses 3.

Further, part of the light entered from the outside enters to the colored layer 4 and is absorbed by the colored layer 4.

Hereinafter, prior to proceeding to the description of the method of manufacturing the microlens substrate (the method of forming a colored layer on the microlens substrate) of the invention, the method of manufacturing the substrate with concave portions for microlenses (substrate with concave portions) of the invention that is used for manufacturing the microlens substrate will be described first by reference to FIGS. 2–7.

In this regard, in the following explanation, a method in which desired concave portions (namely, the concave portions each having a desired shape and size) for lenses (concave portions for microlenses) are obtained by forming a plurality of initial holes in a mask prepared on the surface of a substrate by means of a physical method or laser irradiation, and then carrying out an etching process to the plurality of initial holes will be described as an example. However, a method of forming the substrate with concave portions for microlenses is not limited to this method. For example, any method such as a method of forming the concave portions for lenses by forming openings in the mask formed on the surface of the substrate by means of a photolithography technology or the like may be used.

In the present embodiment, desired concave portions (namely, the concave portions each having a desired shape and size) for lenses (concave portions for microlenses) are obtained by forming a plurality of initial holes in a mask prepared on the surface of a substrate by means of a physical method or laser irradiation, and then carrying out an etching process to the plurality of initial holes. Although a large number of concave portions for microlenses are actually formed on the substrate, the description in the following will be given by showing only a part of them in order to simplify the explanation.

First, the substrate 11 is prepared in manufacturing the substrate 10 with concave portions for microlenses.

It is preferable that a substrate having a uniform thickness without flexure and blemishes is used for the substrate 11. Further, it is also preferable that a substrate with a surface cleaned by washing or the like is used for the substrate 11.

Although alkali-free glass, soda-lime glass, crystalline glass, quartz glass, lead glass, potassium glass, borosilicate glass, or the like may be mentioned as the material for the substrate 11, alkali-free glass and crystalline glass (for example, neoceram or the like) are preferable among them. By the use of alkali-free glass or crystalline glass, it is easy to process the material for the substrate 11, and it is advantageous from the viewpoint of manufacturing cost because alkali-free glass or crystalline glass is relatively inexpensive.

Although the thickness of the substrate 11 varies depending upon various conditions such as the material constituting the substrate 11 and its index of refraction, it is generally preferable to be in the range of 0.3 to 3.0 mm, and more preferably it is in the range of 0.5 to 2.0 mm. By restricting the range of the thickness in such a range, it is possible to obtain a compact substrate 10 with concave portions for microlenses that has required optical properties.

<1> As shown in FIG. 2(a), a mask 12 is formed on the surface of the prepared substrate 11 (mask formation process). Then, a rear face protective film 13 is formed on the rear face of the substrate 11 (i.e., the face side opposite to the face on which the mask 12 is formed). Needless to say, the mask 12 and the rear face protective film 13 may be formed simultaneously.

It is preferable that the mask 12 permits initial holes 121 to be formed therein by means of a physical method or irradiation with laser beams in step <2> (described later), and has resistance to etching in step <3> (described later). In other words, it is preferable that the mask 12 is constituted such that it has an etching rate nearly equal to or smaller than that of the substrate 11.

From such a viewpoint, for example, metals such as Cr, Au, Ni, Ti, Pt and the like, alloys containing two or more kinds selected from these metals, oxides of these metals (metal oxides), silicon, resins, and the like may be mentioned as the material for the mask 12. Alternatively, the mask 12 may be given a laminated structure by a plurality of layers formed of different materials such as a Cr/Au laminate.

The method of forming the mask 12 is not particularly limited. In the case where the mask 12 is constituted from metal materials (including alloy) such as Cr and Au or metal oxides such as chromium oxide, the mask 12 can be suitably formed by an evaporation method, a sputtering method, or the like, for example. On the other hand, in the case where the mask 12 is formed of silicon, the mask 12 can be suitably formed by a sputtering method, a CVD method, or the like, for example.

In the case where the mask 12 is formed of chromium oxide or chromium as a main component thereof, the initial holes 121 can be easily formed by an initial hole formation process (described later), and the substrate 11 can be protected in the etching process more surely. Further, when the mask 12 has been formed of chromium as a main component thereof, in the initial hole formation process (described later), a solution of ammonium hydrogen difluoride ($NH_4HF_2$), for example, may be used as an etchant. Since a 4 wt % or less solution (containing 4 wt % (i.e., 4% by weight) or less of ammonium hydrogen difluoride) is not poison, it is possible to prevent its influence on the human body during work and on the environment more surely.

In the case where the mask 12 is formed of Au as a main component thereof, by making the thickness of the mask 12 relatively large, for example, the impact of collision of blast media (shot balls) 21 during the blast processing in step <2> (described later) can be reduced, thereby being capable of making the shapes of the formed initial holes 121 well-balanced.

Although the thickness of the mask 12 also varies depending upon the material constituting the mask 12, it is preferable to be in the range of 0.05 to 2.0 μm, and more preferably it is in the range of 0.1 to 0.5 μm. If the thickness is below the lower limit given above, it becomes difficult depending upon the constituent material or the like of the mask 12 to sufficiently reduce the impact of the shot during the shot blast process in step <2> (described later), whereby there is a possibility to deform shapes of the formed initial holes 121. In addition, there is a possibility that sufficient protection for the masked portion of the substrate 11 cannot be obtained during a wet etching process in step <3> (described later). On the other hand, if the thickness is over the upper limit given above, in addition to the difficulty in formation of the initial holes 121 by means of the physical method or the irradiation with laser beams in step <2> (described later), there will be a case in which the mask 12 tends to be easily removed due to internal stress of the mask 12 depending upon the constituent material or the like of the mask 12.

The rear face protective film 13 is provided for protecting the rear face of the substrate 11 in the subsequent processes. Erosion, deterioration or the like of the rear face of the substrate 11 is suitably prevented by means of the rear face protective film 13. Since the rear face protective film 13 is formed using the same material as the mask 12, it may be provided in a manner similar to the formation of the mask 12 simultaneous with the formation of the mask 12.

<2> Next, as shown in FIGS. 2(b) and 3(c), the plurality of initial holes 121 that will be utilized as mask openings in the etching process (described later) are formed in the mask 12 at random by means of the physical method or the irradiation with laser beams (initial hole formation process).

The physical methods of forming the initial holes 121 includes such methods as, for example, a blast processing such as shot blast, sand blast or the like, etching, pressing, dot printing, tapping, rubbing, or the like. In the case where the initial holes 121 are formed by means of the blast processing, it is possible to form the initial holes 121 with high efficiency in a shorter time even for a substrate 11 with a relatively large area (i.e., area of the region for formation of microlenses 3).

Further, in the case where the initial holes 121 are formed by means of irradiation with laser beams, the kind of laser beams to be used is not particularly limited, but a ruby laser, a semiconductor laser, a YAG laser, a femtosecond laser, a glass laser, a $YVO_4$ laser, a Ne—He laser, an Ar laser, a carbon dioxide laser, or the like may be mentioned. In the case where the initial holes 121 are formed by means of the irradiation of laser beams, it is possible to easily and precisely control the size of each of the initial holes 121, intervals between adjacent initial holes 121, or the like.

Here, in particular, the case of forming the initial holes 121 on the mask 12 by employing shot blast as the physical method will be described as an example.

In the shot blast, as shown in FIG. 2(b), the initial holes 121 are formed in the mask 12 by spraying blast media 21 onto the surface of the mask 12 from a nozzle 20 arranged perpendicularly to the surface above the surface where the mask 12 is formed on the substrate 11. The initial holes 121 are formed on the entire surface of the mask 12 by applying shot blast over the entire surface of the mask 12 with the movement of the nozzle 20 in the direction as shown by arrows A1 and A2 in FIG. 2(b).

As the blast media 21, steel grit, brown fused alumina, white fused alumina, glass bead, stainless steel bead, garnet, silica sand, plastic, cut wire, slag, or the like may be mentioned, and glass bead is especially preferable among them. By using such blast media, it is possible to form the initial holes 121 on the mask 12 suitably.

It is preferable that the average diameter of the blast media 21 is in the range of 20 to 200 μm, and more preferably it is in the range of 50 to 100 μm. If the average diameter of the blast media 21 is less than the lower limit given above, the formation of the initial holes 121 with high efficiency may become difficult, or the particles of the blast media 21 may form an agglutination having a diameter over the upper limit given above by means of adsorption thereof. On the other hand, if the average diameter of the blast media 21 is over the upper limit given above, the formed initial holes 121 become large, the initial holes 121 become large-sized by mutual sticking, or initial holes 121 each having a different shape tend to be formed.

It is preferable that the blast pressure of the blast media 21 (i.e., this means air pressure in the spraying process) is in the range of 1 to 10 $kg/cm^2$, and more preferably it is in the range of 3 to 5 $kg/cm^2$. If the blast pressure of the blast media 21 is less than the lower limit given above, the impact of shot is weakened, whereby there is a case in which sure formation of the initial holes 121 in the mask 12 becomes difficult. On the other hand, if the blast pressure of the blast media 21 is over the upper limit given above, the impact of shot becomes too strong, and therefore, there is a possibility that the particles of blast media 21 are crushed, or the shapes of the initial holes 121 is deformed by the impact.

Further, it is preferable that the spraying density (blast density; this means weight of the blast media 21 sprayed on per unit area of the mask 12) of the blast media 21 is in the range of 10 to 100 $kg/m^2$, and more preferably it is in the range of 30 to 50 $kg/m^2$. If the spraying density of the blast media 21 is less than the lower limit given above, the number of shots is decreased, and therefore, it takes a long time to form the initial holes 121 uniformly on the entire surface of the mask 12. On the other hand, if the spraying density of the blast media 21 is over the upper limit given above, the initial holes 121 are formed in an overlapping manner so that large holes are formed by joining with each other, or so that initial holes each having a different shape tend to be formed.

The initial holes 121 are formed in the mask 12 as shown in FIG. 3(c) by carrying out the shot blast mentioned above.

It is preferable that the initial holes 121 are formed uniformly on the entire surface of the mask 12. Further, it is preferable that the initial holes 121 are formed in such a manner in which small holes are arranged with a predetermined interval so that there is no flat portion on the surface of the substrate 11, and that the surface is covered with concave portions with almost no space when a wet etching process is carried out in step <3> (described later). For that purpose, the duration of the shot blast may be increased, or the shot blast process may be repeated for several times.

More specifically, for example, it is preferable that the shapes of the formed initial holes 121 when viewed from a top of the substrate 11 is nearly circular and each of the initial holes 121 has an average diameter of the range of 2 to 10 μm. Further, it is preferable that the initial holes 121 are formed on the mask 12 at the rate of one thousand to one million holes per square centimeter ($cm^2$), and more preferably at the rate of ten thousand to 500 thousand holes per square centimeter ($cm^2$). Furthermore, needless to say, the shape of the initial hole 121 is not limited to a nearly circular shape.

When the initial holes 121 are formed in the mask 12, as shown in FIG. 3(c), initial concave portions 111 may also be formed by removing parts of the surface of the substrate 11 in addition to the initial holes 121. This makes it possible to increase contact area with the etchant when the etching process in step <3> (described later) is carried out, whereby erosion can be made to start suitably. Further, by adjusting the depths of the initial concave portions 111 it is also possible to adjust the depths of the concave portions 14 (i.e., maximum thickness of the lens). Although the depth of the initial concave portion 111 is not particularly limited, it is preferable that it is 5.0 μm or less, and more preferably it is in the range of 0.1 to 0.5 μm.

As mentioned above, the case of forming the initial holes 121 in the mask 12 by means of the shot blast is described as an example, but the method of forming the initial holes 121 in the mask 12 is not limited to the shot blast. For example, the initial holes 121 may be formed in the mask 12 by a variety of physical methods mentioned above (for example, a blast processing other than shot blast, etching, pressing, dot printing, tapping, rubbing, or the like), irradiation with laser beams, or the like.

The arrangement of the formed initial holes 121 is not particularly limited. The formed initial holes 121 may be regularly or randomly arranged in the mask 12. In the case where the obtained substrate with concave portions (i.e., the substrate with concave portions for microlenses) is used for manufacturing a screen or rear projection described later, it is preferable that the initial holes 121 are randomly arranged in the mask 12. This makes it possible to prevent occurrence of an interference pattern such as so-called moire, for example, effectively.

In the case where the initial holes 121 are formed by pressing (press working), the initial holes 121 can be formed, for example, by pressing a roller having protrusions with a predetermined pattern (for example, a random pattern) on the mask 12 and rolling the roller over the mask 12.

Further, the initial holes 121 may be formed in the formed mask 12 not only by means of the physical method or the irradiation with laser beams, but also by, for example, previously arranging foreign objects on the substrate 11 with a predetermined pattern when the mask 12 is formed on the substrate 11, and then forming the mask 12 on the substrate 11 with the foreign objects to form defects in the mask 12 by design so that the defects are utilized as the initial holes 121.

In the present invention, the method of forming the substrate with concave portions is not particularly limited. By the forming the initial holes 121 in the mask 12 by means of the physical method or the irradiation with laser beams, it is possible to form openings (i.e., the initial holes 121) with a predetermined pattern (for example, at random) in the mask 12 easily and inexpensively. Further, the physical method or the irradiation with laser beams makes it possible to deal with a large-sized substrate easily.

<3> Next, as shown in FIGS. 3(d) and 4(e), a large number of concave portions 14 are formed on the substrate 11 by applying the etching process to the substrate 11 using the mask 12 (etching process).

The etching method is not particularly limited, and a wet etching process, a dry etching process, or the like may be mentioned as an example. In the following explanation, the case of using the wet etching process will be described as an example.

By applying the wet etching process to the substrate 11 covered with the mask 12 in which the initial holes 121 are formed, as shown in FIG. 3(d), the substrate 11 is eroded from the portions where no mask is present, namely, from the initial holes 121, whereby a large number of concave portions 14 are formed on the substrate 11.

Further, in the present embodiment, the initial concave portions 111 are formed on the surface of the substrate 11 when the initial holes 121 are formed in the mask 12 in step <2>. This makes the contact area with the etchant increase during the etching process to the substrate, whereby the erosion can be made to start suitably.

Moreover, the formation of the concave portions 14 can be carried out suitably by employing the wet etching process. In the case where an etchant containing hydrofluoric acid or fluoride ion (hydrofluoric acid-based etchant) is utilized for an etchant, for example, the substrate 11 can be eroded more selectively, and this makes it possible to form the concave portions 14 suitably.

In the case where the mask 12 is mainly constituted from chromium (i.e., the mask 12 is formed of a material containing Cr as a main component thereof), a solution of ammonium hydrogen difluoride is particularly suited as a hydrofluoric acid-based etchant. Since a 4 wt % or less solution (containing 4 wt % (i.e., 4% by weight) or less of ammonium hydrogen difluoride) is not poison, it is possible to prevent its influence on the human body during work and on the environment more surely.

Further, the wet etching process permits the processing with simpler equipment than in the dry etching process, and allows the processing for a larger number of substrates at a time. This makes it possible to enhance productivity of the substrates, and it is possible to provide the substrate 10 with concave portions for microlenses at a lower cost. As a result, it is possible to enhance productivities of the microlens substrates, the transmission screens, the rear projections, and the like, whereby it is possible to further reduce the manufacturing cost thereof.

<4> Next, the mask 12 is removed as shown in FIG. 5(f) (mask removal process). At this time, the rear face protective film 13 is removed along with the removal of the mask 12.

In the case where the mask 12 is mainly constituted from chromium, the removal of the mask 12 can be carried out by means of an etching process using a mixture of ceric ammonium nitrate and perchloric acid, for example.

As a result of the processing in the above, as shown in FIGS. 5(f) and 8, a substrate 10 with concave portions for microlenses in which a large number of concave portions 14 are randomly formed on the substrate 11 is obtained. In this case, as shown in FIG. 8, although the concave portions 14 formed on the substrate 11 are distributed randomly, the arrangement of them is not limited to this structure, and the concave portions 14 may be formed in a regular pattern.

As described above, desired concave portions 14 can be formed on the substrate 11 by first forming the initial holes 121 in the mask 12 by means of the physical method or the irradiation with laser beams, and then carrying out the etching process using the mask 12 with the initial holes 121, whereby it is possible to manufacture the substrate 10 with concave portions for microlenses equipped with concave portions 14.

Further, by forming the initial holes 121 in the mask 12 by means of the physical method or the irradiation with laser beams, it is possible to form openings (initial holes 121) with a predetermined pattern in the mask 12 more easily and inexpensively. This makes it possible to enhance productivity of the substrate 10 with concave portions for microlenses, whereby it is possible to provide the substrate 10 with concave portions for microlenses at a lower cost. As a result, it is possible to enhance productivities of the microlens substrates, the transmission screens, the rear projections, and the like, whereby it is possible to further reduce the manufacturing cost thereof.

Further, according to the method described above, it is possible to carry out a processing for a large-sized substrate easily. Namely, according to the method, in the case of manufacturing such a large-sized substrate, there is no need to bond a plurality of substrates as the conventional method, whereby it is possible to eliminate the appearance of seams of bonding. This also makes it possible to manufacture a high quality large-sized substrate with concave portions for microlenses by means of a simple method at a low cost.

Moreover, after the mask 12 is removed in step <4>, a new mask 122 may be formed on the substrate 11, and then a series of processes including a mask formation process, an initial hole formation process, a wet etching process, and a mask removal process may be repeated. Hereinafter, a specific example will be described.

<B1> First, as shown in FIG. 6(g), a new mask 122 is formed on the substrate 11 on which the concave portions 14 are formed. The mask 122 may be formed in the same way as the mask 12 described above (mask formation process).

<B2> Next, as shown in FIG. 6(h), initial holes 123 are formed in the mask 122 by means of, for example, the physical method or the irradiation with laser beams described above (initial hole formation process). At this time, as shown in FIG. 6(h), initial concave portions 112 may be formed on the surface of the substrate 11.

<B3> Then, as shown in FIG. 7(i), concave portions 141 are formed by applying an etching process similar to the above-mentioned process using the mask 122 (etching process).

<B4> Finally, as shown in FIG. 7(j), the mask 122 and the rear face protective film 13 are removed (mask removal process).

Steps <B1> to <B4> may be carried out by the methods similar to steps <1> to <4>.

In this way, by repeatedly carrying out a series of processes, it is possible to form concave portions over the entire surface of the substrate 11 without bias, and to arrange the shapes of the concave portions uniformly.

Further, the conditions in each process may be changed for the second or subsequent rounds from those of the first round. By changing the conditions in each process to adjust the shapes (size, depth, curvature, concave shape of the concave portion, or the like) of the formed concave portions 14, the substrate 11 having a desired form may be obtained.

For example, in the initial hole formation process, the size and the density of the initial holes 121 formed in the mask 12, and the size and the depth of the initial concave portions 111 formed in the substrate 11, or the like, can be adjusted by changing the conditions such as the diameter of the blast media 21, the blast pressure or the spraying density of the blast media 21, the processing duration, or the like.

Further, for example, the first round of initial hole formation process and/or at least one of the second and subsequent rounds of initial hole formation process may be carried out by means of the method other than the physical method or the irradiation with laser beams (for example, a method using photolithography technology, or the like).

Furthermore, in the etching process, the shapes of the formed concave portions 14 can be adjusted by changing the etching rate. For example, by decreasing the etching rate gradually, it is possible to arrange the shapes of a plurality of formed concave portions 14 uniformly.

Moreover, for example, in the first round of etching process, by setting the etching rate to a large (or small) value, flat portions of the substrate surface may be eliminated (pre-etching process), and in the second and the subsequent rounds of etching process, by setting the etching rate to a small (or large) value, the concave portions 14 may be formed (regular etching process).

Furthermore, by changing the size of the initial holes 121, the size and the depth of the initial concave portions 111, or the like, and further by changing the etching rate, it is possible to make the formed concave portions 14 become a desired aspherical shape.

Here, in the case where the series of processes described above are carried out repeatedly, the rear face protective film 13 may be used repeatedly without being removed in step <4> or the like.

Hereinafter, a method of manufacturing a microlens substrate using the substrate 10 with concave portions for microlenses will be described with reference to FIGS. 9 and 10.

In this regard, needless to say, the substrate 10 with concave portions for microlenses and the microlens substrate of the invention can be used for a transmission screen and a rear projection (described later), and in addition, they can be used for various kinds of electro-optical devices such as a liquid crystal display (liquid crystal panel), an organic or inorganic electroluminescent (EL) display, a charge-coupled device (CCD), an optical communication device or the like, and other devices.

The microlens substrate of the present invention can be manufactured by means of the 2P method (photopolymerization) in which the substrate 10 with concave portions for microlenses manufactured in the manner described above is used as a mold, or the like.

Hereinafter, a method of manufacturing the microlens substrate by means of the 2P method will be described with reference to FIGS. 9 and 10.

First, as shown in FIG. 9(a), the substrate 10 with concave portions for microlenses having a plurality of concave portions 14 for microlenses is prepared. In this method, the substrate 10 with concave portions for microlenses having the plurality of concave portions 14 is utilized as a mold. By filling resin in the concave portions 14, the microlenses 3 are formed. In this case, the inner surface of the concave portions 14 may be coated with a mold release agent or the like, for example. Then, the substrate 10 with concave portions for microlenses is set, for example, so as to have the concave portions 14 open vertically upward.

<C1> Next, uncured resin that will constitute a resin layer 31 (microlenses 3) is supplied on the substrate 10 with concave portions for microlenses having the concave portions 14.

<C2> Next, a base 2 is joined to the uncured resin (i.e., resin layer 31), and the base 2 is made to be closely contacted with the uncured resin by pressing.

It is preferred that a base having a uniform thickness without flexure and blemishes is used for the base 2. As for examples of materials that can be used for the base 2, thermoplastic resins including polyamide (e.g. nylon 6, nylon 46, nylon 66, nylon 610, nylon 612, nylon 11, nylon 12, nylon 6–12, nylon 6–66, and the like), thermoplastic polyimide, liquid crystal polymer such as aromatic polyester and the like, polyphenylene oxide, polyphenylene sulfide, polyolefin such as polyethylene, polypropylene, ethylene-vinyl acetate copolymer and the like, denatured polyolefin, polycarbonate (PC), acrylic (methacrylic), polymethyl methacrylate, polyester such as polyethylene terephthalate (PET), polybutylene terephthalate (PBT) and the like, polyether, polyether ether ketone (PEEK), polyether imide, polyacetal (POM), and the like; thermosetting resins including epoxy resins such as bisphenol type, novolac type, naphthalene-based epoxy resin and the like, phenolic resins, urea resins, melamine resins, unsaturated polyester, polyimide resins, silicone resins, polyurethane resins, and the like; and copolymers, blended bodies and polymer alloys and the like having at least one of these materials as a main ingredient can be mentioned. Acrylic and polycarbonate are preferable in these materials. By employing the substrate constituted from acrylic or polycarbonate as the substrate 2, the obtained microlens substrate 1 can have suitable optical characteristics. Further, it is advantageous from the viewpoint of manufacturing cost because acrylic or polycarbonate is relatively inexpensive.

<C3> Next, the resin is cured (or hardened). The method of curing the resin is appropriately selected according to the kind of the resin, and for example, ultraviolet irradiation, heating, electron beam irradiation, or the like may be mentioned.

In this way, as shown in FIG. 9(b), the resin layer 31 is formed, and the microlenses 3 are formed by means of the resin filled in the concave portions 14.

<C4> Next, as shown in FIG. 9(c), the substrate 10 with concave portions for microlenses functioning as the mold is removed from the microlenses 3.

<C5> Next, as shown in FIG. 10(d), the substrate 2 is placed so that the microlenses 3 face upward, for example.

<C6> Next, a colored layer 4 is formed in troughs 32 formed between adjacent microlenses 3.

Hereinafter, a method of forming a colored layer according to the present invention will be described.

The present invention has a feature that after applying a colored liquid (a liquid 42 for forming a colored layer) with fluidity to a convex surface side of the microlenses 3, more specifically, the troughs 32 provided between adjacent microlenses 3, the liquid is hardened.

Thus, in the present invention, by using a liquid with fluidity it is easy to apply the liquid to the troughs 32 between adjacent microlenses 3 selectively.

Further, since the liquid flowing into the troughs 32 between adjacent microlenses 3 forms a meniscus using the liquid with fluidity, the liquid can adhere to curved surfaces of the troughs 32 suitably. This makes it possible to enhance efficiency of formation of the colored layer 4, and to improve adhesion between the colored layer 4 and the resin layer 31 constituting the microlenses 3.

The liquid 42 for forming a colored layer that is used in the present invention is not particularly limited as long as it has fluidity and is colored (i.e., the liquid that can absorb incident light). For example, a liquid in molten state, a liquid in the form of a solution, a dispersion liquid (for example, suspension, emulsion, or the like), or the like may be mentioned, and a solution or a dispersion liquid is preferable. In the case where the liquid 42 for forming a colored layer is a solution or a dispersion liquid, it is easy to apply the liquid 42 to the troughs 32 between adjacent microlenses 3 selectively, and the liquid 42 can adhere to curved surfaces constituting the troughs 32 more suitably even though a meniscus is formed. This makes it possible to enhance the efficiency of formation of the colored layer 4, and to improve adhesion between the colored layer 4 and the resin layer 31 constituting the microlenses 3. Further, in the case where the liquid 42 for forming a colored layer is a solution or a dispersion liquid, it is possible to prevent damages due to thermal or the like, for example, to the resin layer 31 (in particular, the microlenses 3) more effectively when the liquid 42 for forming a colored layer is applied to the troughs 32.

The liquid 42 for forming a colored layer that is used in the present invention is not particularly limited as long as it has fluidity and is colored (i.e., the liquid that can absorb incident light). It is preferable that the liquid 42 meets conditions.

(1) It is preferable that the liquid 42 for forming a colored layer has a proper coefficient of viscosity. More specifically, it is preferable that a coefficient of viscosity at a temperature of 25° C. of the liquid 42 is 500 cP or less. More preferably it is 100 cP or less. By restricting the coefficient of viscosity at a temperature of 25° C. of the liquid 42 in such a range, the efficiency of formation of the colored layer 4 is especially excellent. On the contrary, in the case where the coefficient of viscosity at a temperature of 25° C. of the liquid 42 is over the upper limit given above, the fluidity of the liquid 42 drops down, whereby it is difficult to stream (throw) the liquid 42 for forming a colored layer onto the troughs 32 between adjacent microlenses 3. As a result, the efficiency of formation of the colored layer 4 may become down (drop down). Further, the liquid 42 may remain on a portion other than the troughs 32, for example, the effective lens regions of the microlenses 3 or the like, whereby usability of light of the microlens substrate 1 on which the colored layer 4 is formed tend to drop down.

(2) It is preferable that a contact angle of the liquid 42 to the microlens substrate 1 (microlenses 3 or the resin layer 31) is less than 90° during the application of the liquid 42. More preferably it is in the range of 1 to 50°. By restricting the contact angle of the liquid 42 to the microlens substrate 1 in such a range, it is possible to further enhance the efficiency of formation of the colored layer 4 and to improve adhesion between the colored layer 4 and the microlens substrate 1 (microlenses 3). On the contrary, in the case where the contact angle of the liquid 42 to the microlens substrate 1 is over the upper limit given above, i.e., over 90°, water-shedding quality (repellency) of the liquid 42 becomes great, whereby it is difficult to stream (throw) the liquid 42 for forming a colored layer onto the troughs 32 between adjacent microlenses 3. As a result, the efficiency of formation of the colored layer 4 may become down (drop down).

(3) It is preferable that the optical density of the liquid 42 is higher than that of each of the microlenses 3 when the wavelength of the light is 587.56 nm. In the case where the optical density of the liquid 42 when the wavelength of the light is 587.56 nm is higher than the optical density of the microlenses 3 when the wavelength of the light is 587.56 nm, it is possible to absorb the amount of outer light entering the formed colored layer 4 greater than the amount of outer light entering the microlenses 3. In other words, it is possible to make absorptivity of a portion on which the colored layer 4 is formed higher than that of the microlenses 3. This makes it possible to improve the contrast of the outer light entering the microlens substrate 1 (i.e., this makes it possible to allow the colored layer 4 to function as a black matrix or the like). In the case where the microlens substrate 1 is used, for example, for manufacturing a transmission screen or rear projection described above, it is possible to make the projected image, which is projected by means of the transmission screen, the rear projection or the like manufactured using the microlens substrate, more excellent (or finer).

Here, the optical density indicates color strength (depth of color) of a transparent medium quantitatively. In the case where light having a predetermined wavelength and intensity of light of $I_0$cd ($I_0$ candela) enters an object (for example, the liquid 42 for forming a colored layer 4) and the object transmits light having intensity of light of Icd, the optical density with respect to the light with the predetermined wavelength is represented by the following equation OD.

$$OD = \log_{10}(I_0/I)$$

As mentioned above, the liquid 42 used in the present invention may be any one of a liquid in molten state, a liquid in the form of a solution, a dispersion liquid (for example, suspension, emulsion, or the like), and the like. Hereinafter, the liquid 42 for forming a colored layer will be described as a dispersion liquid in which a dispersoid is dispersed in a dispersion medium. First, a description will be given for constituents of the liquid 42 for forming a colored layer.

(Dispersion Medium)

Any dispersion medium can be used as the dispersion medium as long as it can disperse the dispersoid (which will be described later) therein. However, it is preferred that such a dispersion medium is comprised of a material that is normally used as a solvent.

Examples of such a material include: inorganic solvents such as water, carbon disulfide, carbon tetrachloride, and the like; and organic solvents such as ketone-based solvents (e.g., methyl ethyl ketone (MEK), acetone, diethyl ketone, methyl isobutyl ketone (MIBK), methyl isopropyl ketone (MIPK), cyclohexanone, 3-heptanone, 4-heptanone, and the like), alcohol-based solvents (e.g., methanol, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allylalcohol, furfuryl alcohol, phenol, and the like), ether-based solvents (e.g., diethyl ether, dipropyl ether, diisopropyl ether, dibutyl ether, 1,2-dimethoxyethane (DME), 1,4-dioxane, tetrahydrofuran (THF), tetrahydropyran (THP), anisole, diethylene glycol dimethyl ether (diglyme), 2-methoxyethanol, and the like), cellosolve-based solvents (e.g., methyl cellosolve, ethyl cellosolve, phenyl cellosolve, and the like), aliphatic hydrocarbon-based solvents (e.g., hexane, pentane, heptane, cyclohexane, methylcyclohexane, octane, didecane, methylcyclohexene, isoprene, and the like), aromatic hydrocarbon-based solvents (e.g., toluene, xylene, benzene, ethylbenzene, naphthalene, and the like), aromatic heterocyclic compound-based solvents (e.g., pyridine, pyrazine, furan, pyrrole, thiophene, 2-methylpyridine, 3-methylpyridine, 4-methylpyridine, furfuryl alcohol, and the like), amide-based solvents (e.g., N,N-dimethyl formamide (DMF), N,N-dimethyl acetamide (DMA), and the like), halogenated compound-based solvents (e.g., dichloromethane, chloroform, 1,2-dichloroethane, trichloroethylene, chlorobenzene, and the like), ester-based solvents (e.g., acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, ethyl benzoate, and the like), amine-based solvents (e.g., trimethylamine, hexylamine, triethylamine, aniline, and the like), nitrile-based solvents (e.g., acrylonitrile, acetonitrile, and the like), nitro-based solvents (e.g., nitromethane, nitroethane, and the like), aldehyde-based solvents (e.g., acetaldehyde, propionaldehyde, butyraldehyde, pentanal, acrylaldehyde, and the like), and the like. These materials can be used singly or in combination of two or more.

Among these materials, it is preferred that the dispersion medium is mainly comprised of water and/or a liquid having high compatibility with water. By using such a dispersion medium, it is possible to improve dispersibility of the dispersoid in the dispersion medium, whereby the grain diameter of the particle of the dispersoid in a liquid 42 for forming a colored layer can become relatively small, and variation in size of particles of the dispersoid can also become small. As a result, the efficiency of formation of the colored layer becomes particularly high.

Further, in the case where a mixture of a plurality of components is used as a constituent material of the dispersion medium, it is preferable that at least two components constituting the mixture which can form an azeotrope (it is preferable to select the at least two components (i.e., the azeotrope) so that a boiling point of the azeotrope becomes minimum). When the dispersion medium is comprised of such an azeotrope, it is possible to effectively eliminate the dispersion medium in a solidification process or the like (described later). Also, it is possible to eliminate the dispersion medium at a relatively low temperature in the solidification process or the like.

As for examples of a liquid which can form an azeotrope with water, carbon disulfide, carbon tetrachloride, methyl ethyl ketone (MEK), acetone, cyclohexanone, 3-heptanone, 4-heptanone, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allyl alcohol, furfuryl alcohol, phenol, dipropyl ether, dibutyl ether, 1,4-dioxane, anisole, 2-methoxyethanol, hexane, heptane, cyclohexane, methylcyclohexane, octane, didecane, methylcyclohexene, isoprene, toluene, benzene, ethyl benzene, naphthalene, pyridine, 2-methylpyridine, 3-methylpyridine, 4-methylpyridine, furfuryl alcohol, chloroform, 1,2-dichloroethane, trichloroethylene, chlorobenzene, acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, ethyl benzoate, trimethylamine, hexylamine, triethylamine, aniline, acrylonitrile, acetonitrile, nitromethane, nitroethane, acrylaldehyde, and the like can be mentioned.

Although the boiling point of the dispersion medium (i.e., the boiling point when the ambient pressure is 1atm) is not limited to any specific value, it is preferably 180° C. or less, more preferably 120° C. or less, and even more preferably in the range of 40 to 100° C. In this way, in the case where the dispersion medium has such a relatively low boiling point, it is possible to eliminate the dispersion medium relatively easily in the solidification process or the like (described later). Further, by using such a material as the dispersion medium, the amount of the dispersion medium remained in the colored layer 4, which is finally obtained, can be made especially small. As a result, it is possible to heighten a ratio of the dispersoid in the colored layer 4, whereby it is possible to improve the function of absorbing outer light of the colored layer 4, in particular.

(Dispersoid)

The dispersoid is normally constituted from a coloring agent (colorant) for coloring the liquid 42 for forming a colored layer. Any coloring agent can be used as the coloring agent as long as it can color the liquid 42 for forming a colored layer (i.e., the colored layer containing a coloring agent can absorb or reflect light entering into the microlenses). As for the coloring agent, for example, pigments, dyes, or the like can be used. As for examples of pigments or dyes, Carbon Black, Spirit Black, Lamp Black (C.I. No. 77266), Magnetite, Titanium Black, Chrome Yellow, Cadmium Yellow, Mineral Arylide Yellow, Navel Yellow, Naphthol Yellow S, Hansa Yellow G, Permanent Yellow NCG, Benzidine Yellow, Quinoline Yellow, Tartrazine Lake, Chrome Orange, Molybdenum Orange, Permanent Orange GTR, Pyrazolone Orange, Benzidine Orange G, Cadmium Red, Permanent Red 4R, Watching Red Calcium Salt, Eosine Lake, Brilliant Carmine 3B, Manganese Violet, Fast Violet B, Methyl violet Lake, Prussian Blue, Cobalt Blue, Alkali Blue Lake, Victoria Blue Lake, Fast Sky Blue, Indanthrene Blue BC, Ultramarine Blue, Aniline Blue, Phthalocyanine Blue, Chalco Oil Blue, Chrome Green, Chromium Oxide, Pigment Green B, Malachite Green Lake, Phthalocyanine Green, Final Yellow Green G, Rhodamine 6G, Quinacridone, Rose Bengal (C.I. No. 45432), C.I. Direct Red 1, C.I. Direct Red 4, C.I. Acid Red 1, C.I. Basic Red 1, C.I. Mordant Red 30, C.I. Pigment Red 48:1, C.I. Pigment Red 57:1, C.I. Pigment Red 122, C.I. Pigment Red 184, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Pigment Blue 15:1, C.I. Pigment Blue 15:3, C.I. Pigment Blue 5:1, C.I. Direct Green 6, C.I. Basic Green 4, C.I. Basic Green 6, C.I. Pigment Yellow 17, C.I. Pigment Yellow 93, C.I. Pigment Yellow 97, C.I. Pigment Yellow 12, C.I. Pigment Yellow 180, C.I. Pigment Yellow 162 and Nigrosine Dye (C.I. No. 50415B), metal oxides such as metal complex salt dye, silica, aluminum oxide, magnetite, maghemite, various kinds of ferrites, cupric oxide, nickel oxide, zinc oxide, zirconium oxide, titanium oxide, magnesium oxide and the like, and magnetic materials including magnetic metals such as Fe, Co and Ni, and the like can be mentioned. These pigments and dyes can be used singly or in combination of two or more.

The pigment is especially preferable among the materials mentioned above. By using the pigment, it is possible to color the liquid 42 for forming a colored layer suitably and easily. In addition, by using the pigment, it is possible to improve the optical density of the liquid 42 for forming a colored layer more suitably and easily, whereby it is possible to improve the function of absorbing outer light of the colored layer 4 formed finally, in particular.

Further, a color of the colored layer 4 is not particularly limited as long as sufficient function of absorbing outer light (i.e., function of absorbing at least a part of incident light) is provided to the colored layer 4, and a variety of colors may be used for the color of the colored layer 4. Among the variety of colors, it is preferable that the color is one having low brightness. More specifically, it is in particular preferable that the color is black. By using a black liquid 42, it is possible to improve the function of absorbing outer light of the colored layer 4.

As for Black Pigments, for example, Carbon Blacks (C.I. Pigment Black 7) such as Furnace Black, Lamp Black, Acetylene Black, Channel Black and the like; metal oxides such as copper oxide, ferrum oxide (C.I. Pigment Black 11), titanium oxide, and the like; and organic pigments such as Aniline Black (C.I. Pigment Black 1), and the like may be mentioned.

It is possible to color-composite black by combining color pigments in place of black pigments mentioned above. As for color pigments, for example, yellow pigments, red pigments, blue pigments, green pigments, and the like may be mentioned.

As for yellow pigments, for example, C.I. Pigment Yellow 1 (Arylide Yellow G), C.I. Pigment Yellow 3, C.I. Pigment Yellow 12 (Diarylide Yellow AAA), C.I. Pigment Yellow 13, C.I. Pigment Yellow 14, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (Iron Oxide Yellow), C.I. Pigment Yellow 53, Pigment Yellow 55, Pigment Yellow 74, Pigment Yellow 81, C.I. Pigment Yellow 83 (Diarylide Yellow HR), C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C. I. Pigment Yellow 108, C.I. Pigment Yellow 109, C.I. Pigment Yellow 110, C.I. Pigment Yellow 117, C.I. Pigment Yellow 120, C. I. Pigment Yellow 128, C. I. Pigment Yellow 138, C.I. Pigment Yellow 153, and the like may be mentioned.

As for red pigments, for example, C.I. Pigment Red 1, C.I. Pigment Red 2, C.I. Pigment Red 3, C.I. Pigment Red 5, C.I. Pigment Red 17, C.I. Pigment Red 22 (Brilliant Fast Scarlet), C.I. Pigment Red 23, C.I. Pigment Red 31, C.I. Pigment Red 38, C.I. Pigment Red 48:1 (Permanent Red 2B (Barium)), C.I. Pigment Red, C. I. Pigment Red 48:2 (Permanent Red 2B (Calcium)), C.I. Pigment Red 48:3 (Permanent Red 2B (Strontium)), C.I. Pigment Red 48:4 (Permanent Red 2B (Manganese)), C.I. Pigment Red 49:1, C.I. Pigment Red 52:2, C.I. Pigment Red 53:1, C.I. Pigment Red 57:1 (Brilliant Carmine 6B), C.I. Pigment Red 60:1, C.I. Pigment Red 63:1, C.I. Pigment Red 63:2, C.I. Pigment Red 64:1, C.I. Pigment Red 81 (Rhodamine 6G Lake), C.I. Pigment Red 83, C.I. Pigment Red 88, C.I. Pigment Red 101 (Synthetic Red Iron Oxide), C.I. Pigment Red 104, C.I. Pigment Red 105, C.I. Pigment Red 106, C.I. Pigment Red 108, C.I. Pigment Red 112, C. I. Pigment Red 114, C. I. Pigment Red 122 (Quinacridone Magenta Y), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 202, C.I. Pigment Red 209, C.I. Pigment Red 219, and the like may be mentioned.

As for blue pigments, for example, C.I. Pigment Blue 1, C.I. Pigment Blue 2, C.I. Pigment Blue 15 (Phthalocyanine Blue R), C.I. Pigment Blue 15:1, C.I. Pigment Blue 15:2, C.I. Pigment Blue 15:3 (Phthalocyanine Blue G), C.I. Pigment Blue 15:4, C.I. Pigment Blue 15:6 (Phthalocyanine Blue E), C.I. Pigment Blue 16, C.I. Pigment Blue 17:1, C.I. Pigment Blue 56, C.I. Pigment Blue 60, C.I. Pigment Blue 63 and the like may be mentioned.

As for green pigments, for example, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18, C.I. Pigment Green 36 and the like may be mentioned.

The pigments mentioned above may be used by combining two or more types of pigments of the same sort, or combining different color's pigments. Thus, it is possible to adjust a color (hue, saturation, brightness, or the like), or to adjust an optical density thereof.

Further, it is preferable that an average grain diameter of the pigment is in the range of 0.03 to 20 µm. More preferably it is in the range of 0.1 to 10 µm. In the case where the average grain diameter of the pigment is over the upper limit given above, it is difficult to stream (throw) the pigment onto the troughs 32 between adjacent microlenses 3, whereby there will be a case in which it is difficult to form a desired colored layer 4. On the other hand, in the case where the average grain diameter of the pigment is less than the lower limit given above, there will be a case in which the particles of the pigment tends to clump (i.e., make secondary particles) easily. As a result, an average grain diameter of the secondary particles of the pigment tends to be over the upper limit given above, whereby there will be a case in which the disadvantage mentioned above occurs.

The method of dispersing the dispersoid into the disperse medium mentioned above is not particularly limited. For example, a method by ultrasonic dispersion, a beads mill, a sand mill, a roll mill, and the like may be mentioned.

(Additive)

In this case, in order to carry out the application of the liquid 42 for forming a colored layer to the microlenses 3 suitably, and for the purpose of ensuring stability of the liquid 42, additives such as a moisturizing agent (humectant), a dissolution auxiliary agent, a permeance control agent, a viscosity modifier, a pH adjuster, an antioxidant, a fungicide, a corrosion inhibitor, a metal ion capturing agent, or the like may be added.

Further, a surfactant may be added in the liquid 42. By adding the surfactant, it is possible to control a contact angle to the microlenses 3 while the liquid 42 is applied onto the microlenses 3.

A surfactant having high compatibility to the liquid 42 is preferable, and one having high permeability and stability is more preferable among surfactants. As for the surfactants, an amphoteric surfactant, a nonionic surfactant, or the like may be mentioned. Examples of the amphoteric surfactants include lauryl dimethylamino acetic acid betaine, 2-alkyl-N-carboxymethyl-N-hydroxyethyl imidazolinium betaine, coconut oil fatty acid amide propyl dimethylamino acid betaine, polyoctyl polyaminoethyl glycine, and other imidazoline derivatives, and the like. Examples of nonionic surfactants include ether-based surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, polyoxyalkylene alkyl ether, and the like, ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate, and the like, fluorine-based surfactants such as fluoroalkyl ester, perfluoroalkyl carbonate, and the like.

Further, as for the pH adjuster, the dissolution auxiliary agent, and the antioxidant, for example, amines such as diethanolamine, triethanolamine, propanolamine, morpholine, and the like and their metamorphosed ones, mineral salts such as potassium hydroxide, sodium hydroxide, lithium hydroxide, and the like, ammonium hydroxide, quaternary ammonium hydroxide (for example, tetramethyl ammonium), carbonates such as potassium carbonate, sodium carbonate, lithium carbonate, phosphates, or N-methyl-2-pyrrolidone, ureas such as urea, thiourea, tetramethylurea, and the like, allophanates such as allophanate, methylallophanate, and the like, biurets such as biuret, dimethylbiuret, tetramethylbiuret, and the like, L-ascorbic acid and ascorbate may be mentioned.

Further, as for viscosity modifiers, for example, Rosins, alginates, polyvinyl alcohol, hydroxypropyl cellulose, carboxymethylcellulose, hydroxyethyl cellulose, methyl cellulose, polyacrylate, polyvinylpyrrolidone, gum arabic starch, and the like may be mentioned.

Moreover, resin components such as thermosetting resins, thermoplastic resins, various types of elastomers, and the like may be included in the liquid 42, for example. This makes it possible to improve adhesion between the formed colored layer 4 and the resin layer 31 (i.e., the troughs 32), for example.

Furthermore, the liquid 42 for forming a colored layer is not limited to the solution or dispersion liquid described above as long as the liquid 42 is hardened after the application onto the microlenses 3. For example, a liquid containing a thermosetting resin, a liquid that is hardened by means of chemical reactions after the application onto the microlenses 3 (for example, a liquid containing a component that becomes macromolecule (polymer molecule) by means of a polymerization reaction), molten material that is in a solid state at room temperature, or the like may be used as the liquid 42.

In the present invention, the liquid 42 described above is hardened to form the colored layer 4 after the liquid 42 for forming a colored layer with fluidity is applied to the troughs 32 between the microlenses 3.

<C6-1> First, as shown in FIG. 10(d), the liquid 42 for forming a colored layer is applied onto the microlenses 3 (the microlens substrate 1).

As for methods of applying the liquid 42 onto the microlenses 3, a method of spraying the liquid 42 onto the microlenses 3, a method of applying the liquid 42 by means of an ink jet, a method of soaking the substrate on which the microlenses 3 are formed in the liquid 42, a method of showering the liquid 42 onto the microlenses 3 by means of a shower head, and the like may be mentioned.

The method of spraying the liquid 42 onto the microlenses 3 is preferable among the methods. According to this method, it is possible to apply the liquid 42 on the troughs 32 between the adjacent microlenses 3 effectively and suitably, and to deal with a large-sized microlens substrate by means of simple equipment easily and at high productivity. This makes it possible to manufacture a microlens substrate 1 with a colored layer 4 at a low cost.

<C6-2> Next, as shown in FIG. 10(e), after applying the liquid 42 onto the microlenses 3, the liquid 42 or the solid thereof adhering to the surface of the microlenses 3, more specifically, a portion corresponding to the effective lens regions of the microlenses 3 is removed before hardening the liquid 42. This makes it possible to prevent the usability of light from dropping down because the colored layer 4 is formed on the effective lens regions of the microlenses 3. As a result, it is possible to enhance the usability of light on the microlenses 3, whereby the microlens substrate 1 can output light with higher luminance.

A method of removing the liquid 42 is not particularly limited. For example, a method of blowing the liquid 42 off by spraying compressed air, a method of wiping up the liquid 42 by rubbing the surface of microlenses 3 with an object having a water-absorbing property such as a sponge, a cloth, a nonwoven close or the like, and the like may be mentioned.

In the case of blowing the liquid 42 off by spraying compressed air, a spray pressure of the compressed air is not particularly limited because influence of the compressed air also depends on a coefficient of viscosity of the liquid 42 or a contact angle of the compressed air to the microlens substrate. It is preferable that the spray pressure is in the range of 0.1 to 10 kgf/cm$^2$, for example. In the case where the spray pressure is less than the lower limit given above, it is impossible to remove the liquid 42 adhering to the surface of the microlenses 3 adequately. On the other hand, in the case where the spray pressure is over the upper limit given above, there is a possibility that the liquid 42 required to form the colored layer 4 which is applied to the troughs 32 between the adjacent microlenses 3 may be removed by means of the compressed air.

<C6-3> Next, as shown in FIG. 10(*f*), the liquid 42 for forming a colored layer is hardened.

The hardening of the liquid 42 can be carried out by removing a solvent or a dispersion medium from the liquid 42, for example.

Further, as for the method of removing the solvent or the dispersion medium from the liquid 42, for example, a method of natural seasoning the microlens substrate 1 at room temperature, a method of evaporating the solvent or the dispersion medium from the liquid 42 by spraying air, a method of evaporating the solvent or the dispersion medium by heating, a method of evaporating the solvent or the dispersion medium under reduced pressure, and the like may be mentioned.

The method of hardening the liquid 42 is not limited to the method of removing the solvent or the dispersion medium. For example, the colored layer 4 may be formed on the troughs 32 by mixing a compound to be hardened by means of a chemical reaction in the dispersion medium and hardening the compound by means of the chemical reaction. Further, a liquid that produces a colored material (a material being capable of absorbing or reflecting incident light into the microlenses 3) may be used as the liquid 42 for forming a colored layer.

Moreover, the colored layer 4 may be formed on the troughs 32 by applying the liquid 42 in which a coloring agent is dispersed into a thermosetting resin onto the microlenses 3 and then heat-hardening the liquid 42.

As described above, the liquid 42 for forming a colored layer is hardened so that the colored layer 4 is formed on the troughs 32 between the microlenses 3.

Accordingly, the microlens substrate 1 as shown in FIG. 1 is obtained.

In this way, in the present invention in which the liquid 42 is hardened to form the colored layer 4 after the liquid 42 for forming a colored layer with fluidity is applied to the troughs 32, it is easy to apply the liquid 42 to the troughs 32 between adjacent microlenses 3 selectively by using the liquid having fluidity. Further, since the liquid entering onto the troughs 32 forms a meniscus, the liquid can adhere to the curved surfaces of the troughs 32 suitably. This makes it possible to enhance the efficiency of formation of the colored layer 4, and to improve adhesion between the colored layer 4 and the microlenses 3 (i.e., the troughs 32).

Further, in the present invention, an alignment process for the microlenses 3 becomes unnecessary while forming the colored layer 4. In addition, it is possible to form the colored layer 4 accurately without misalignment. This makes it possible to form the colored layer 4 on the microlens substrate 1 easily and at a lower cost.

In particular, in the case where microlenses 3 are randomly formed on a microlens substrate, it is difficult to form a colored layer 4 on the microlens substrate while aligning the microlenses 3 in the conventional method using the photolithography technology. On the contrary, in the present invention, it is no need to align the microlens substrate 1 on which the microlenses 3 are randomly formed, and it is possible to form the colored layer 4 accurately without misalignment.

Further, according to the method of the present invention, it is possible to carry out processes for a large-sized substrate easily and suitably.

In the microlens substrate 1 of the present invention obtained in this way, since the colored layer 4 is formed on the troughs 32 between the microlenses 3, openings 41 that are not covered by the colored layer 4 substantially correspond with the effective lens regions of the microlenses 3. Thus, an optical axis Q of the microlens 3 passes through the opening 41 that is not covered by the colored layer 4. Therefore, in the microlens substrate 1, incident light L entered from the face opposite to the colored layer 4 passes through the openings 41 and enters to the microlenses 3, thereby being focused and diffused by the microlenses 3.

In this way, the microlens substrate 1 of the present invention has a plurality of microlenses 3, and is accurately formed without misalignment between the microlenses 3 and the colored layer 4. Thus, in particular, it is possible to prevent extinction of incident light L when the incident light passes through the colored layer 4. Namely, since the microlens substrate 1 has high transmittance for light, it is possible to improve the usability of light. As a result, the microlens substrate 1 can output light with higher luminance.

Furthermore, part of the light entered from the outside enters to the colored layer 4 and is absorbed by the colored layer 4. Thus, it is possible to absorb the outer light without preventing the extinction of the incident light L. Moreover, since straight light is reduced by forming the colored layer 4 on the troughs 32, it is possible to widen a view angle of the microlens substrate 1. As a result, in the case where the microlens substrate 1 is used for a transmission screen or a rear projection described later, for example, the transmission screen or the rear projection becomes excellent one with a high display quality.

In particular, in the case where the microlenses 3 are randomly arranged on the microlens substrate 1, it is possible to prevent light valve of a liquid crystal display (LCD) or the like, or interference to the Fresnel lens more effectively. This makes it possible to prevent occurrence of moire almost completely. Thus, it is possible to obtain an excellent transmission screen with a high display quality.

Further, in the present invention, since the colored layer 4 is formed on the surface of the microlens substrate 1 on which the microlenses 3 are provided, there is an advantage to make the microlens substrate 1 smaller and lighter, whereby the microlens substrate 1 can be put at smaller space.

Meanwhile, since a portion where the microlenses 3 have not been suitably formed in the manufacturing process for the microlens substrate cannot condense (collect light), the microlens substrate 1 has a flaw that the portion remains as a luminescent spot. In the case where the microlens substrate has such a flaw, the formation method of the present invention is advantage. Namely, in the manufacturing method of the present invention, the liquid 42 for forming a colored layer remains on the portion where the microlenses 3 have not been suitably formed to form the colored layer 4. Thus, since light is intercepted in the portion to darken the portion, it is possible to prevent occurrence of the luminescent spot as mentioned above, and therefore to obscure such a flaw. As a result, it is possible to improve yield of the microlens substrate 1 and to provide the microlens substrates 1 at a low cost.

Further, in the above description, a microlens substrate provided with plano-convex lenses (plano-convex microlenses) on one face of which microlenses are formed is used, but the microlens substrate according to the present invention is not limited to this type.

For example, a microlens substrate provided with biconvex lenses on both faces of which microlenses are formed may be used.

Figure 11:
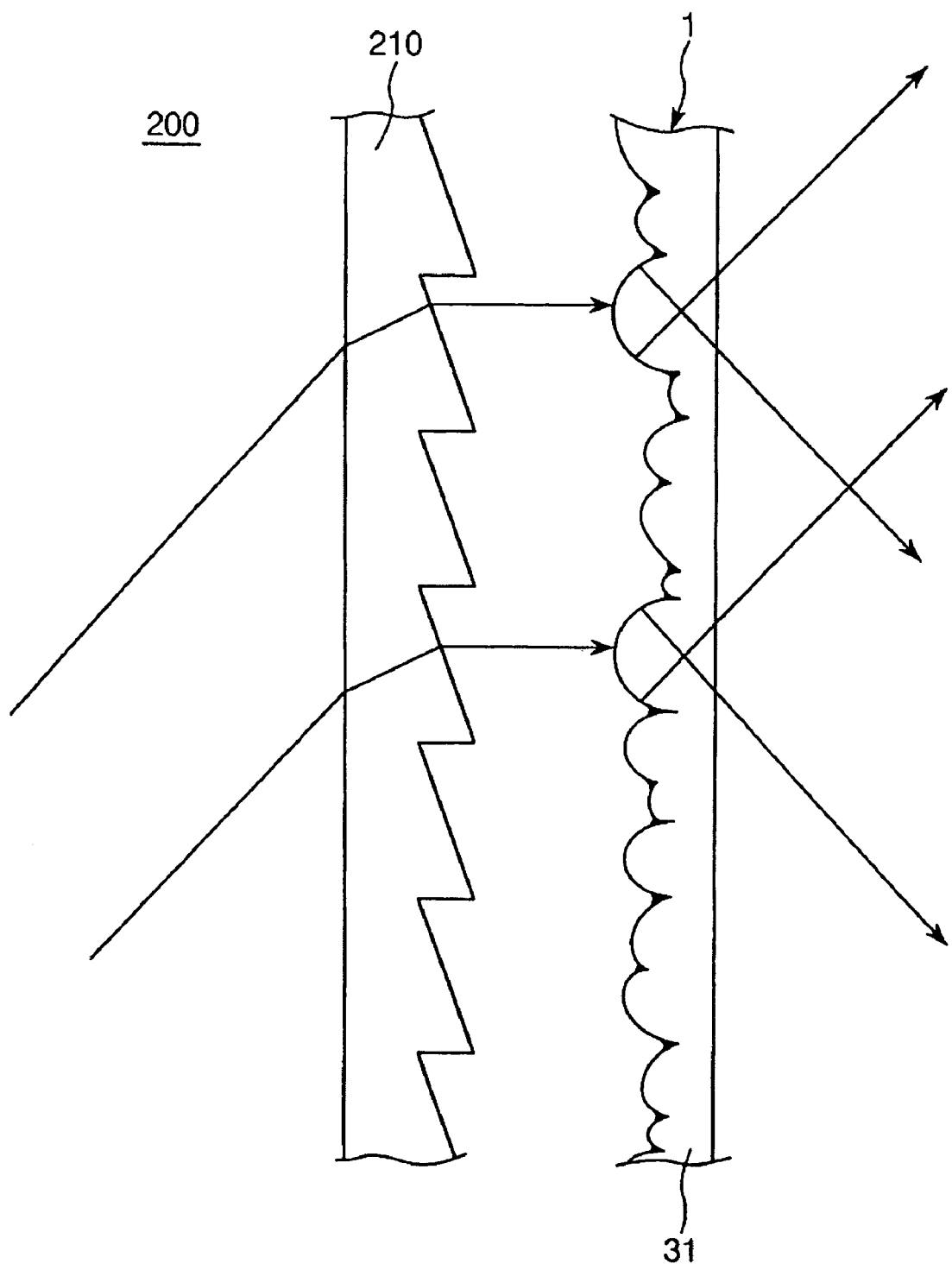
FIG. 11 is a cross-sectional view schematically showing an optical system of a transmission screen of the present invention.
Figure 12:
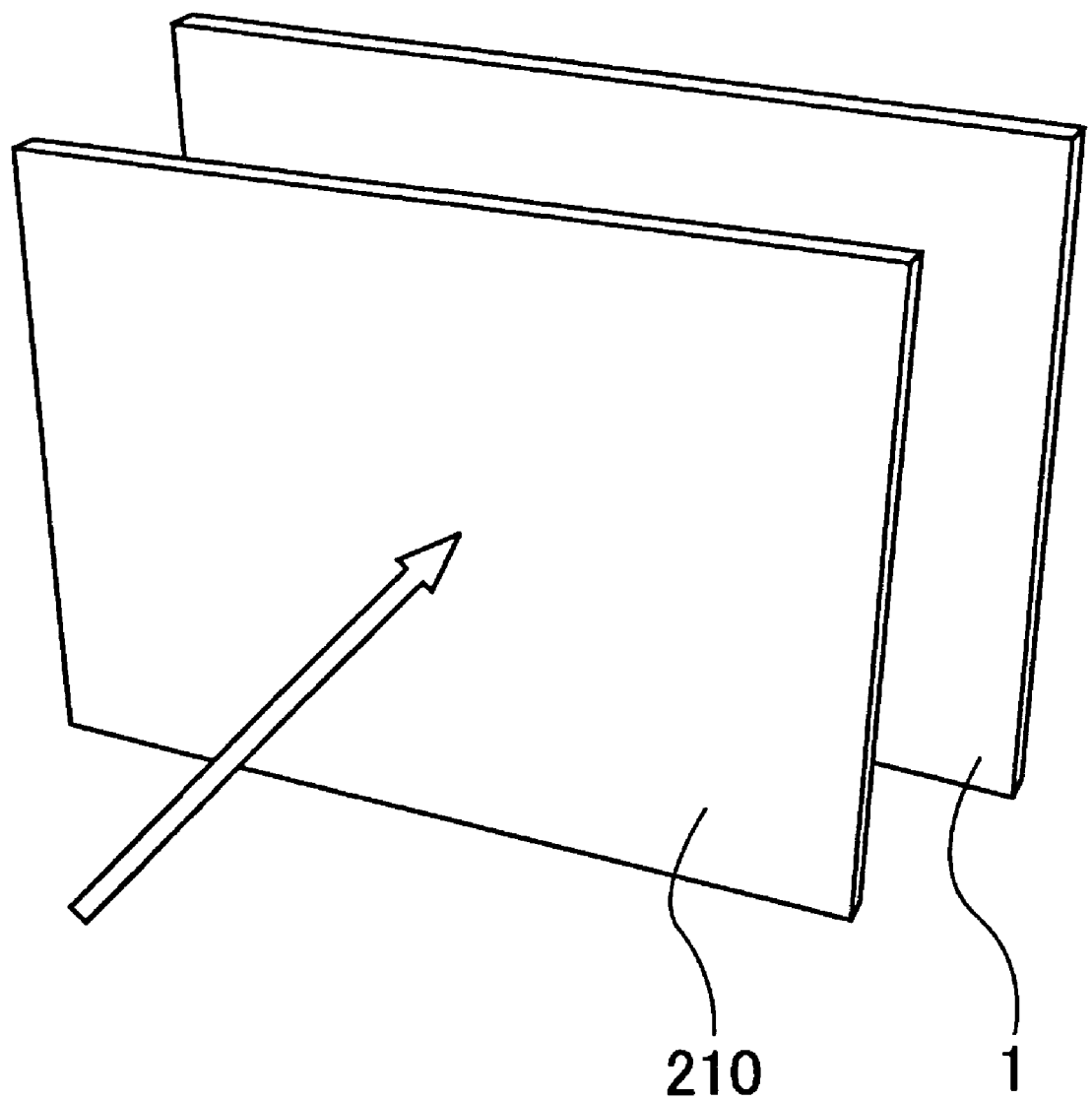
FIG. 12 is an exploded perspective view of the transmission screen shown in FIG. 11.

Next, a description will be given for a transmission screen using the microlens substrate 1 shown in FIG. 1 with reference to FIGS. 11 and 12. FIG. 11 is a cross-sectional view schematically showing the optical system of a transmission screen according to the present invention. FIG. 12 is an exploded perspective view of the transmission screen shown in FIG. 11.

A transmission screen 200 comprises a Fresnel lens portion 210 with a Fresnel lens formed on the surface for emission face thereof, and the microlens substrate 1 with a large number of microlenses 3 formed on the incident face side that is arranged on the emission face side of the Fresnel lens portion 210.

In this way, the transmission screen 200 has the microlens substrate 1, and therefore, the view angle in the vertical direction is wider than the case of using a lenticular lens.

It is preferable that the diameter of each of the microlenses 3 in the microlens substrate 1 is in the range of 10 to 500 μm, and more preferably it is in the range of 30 to 80 μm, and further more preferably it is in the range of 50 to 60 μm. By restricting the diameter of each of the microlenses 3 in the above ranges, it is possible to further enhance the productivity of the transmission screen while maintaining sufficient resolution in the image projected on the screen. In this regard, it is preferable that the pitch between adjacent microlenses 3 in the microlens substrate 1 is in the range of 10 to 500 μm, more preferably the pitch is in the range of 30 to 300 μm, and further more preferably the pitch is in the range of 50 to 200 μm.

In particular, in the case where a substrate on which the microlenses 3 are randomly arranged is used as the microlens substrate 1, it is possible to prevent light valve of a liquid crystal display (LCD) or the like, or interference to the Fresnel lens more effectively. This makes it possible to prevent occurrence of moire almost completely. Thus, it is possible to obtain an excellent transmission screen with a high display quality.

Further, according to the method as mentioned above, it is possible to manufacture a large-sized microlens substrate (i.e., microlens array portion) easily. This makes it possible to manufacture a large-sized screen with a high quality and free from the bonding seams.

In this regard, the transmission screen of the present invention is not limited to the structure as described above. For example, a transmission screen further comprising black stripes, light diffusion plate or another microlens on the emission face side or the incident face side of the microlens substrate (microlens array portion) may be provided.

Hereinafter, a description will be given for a rear projection using the transmission screen.

Figure 13:
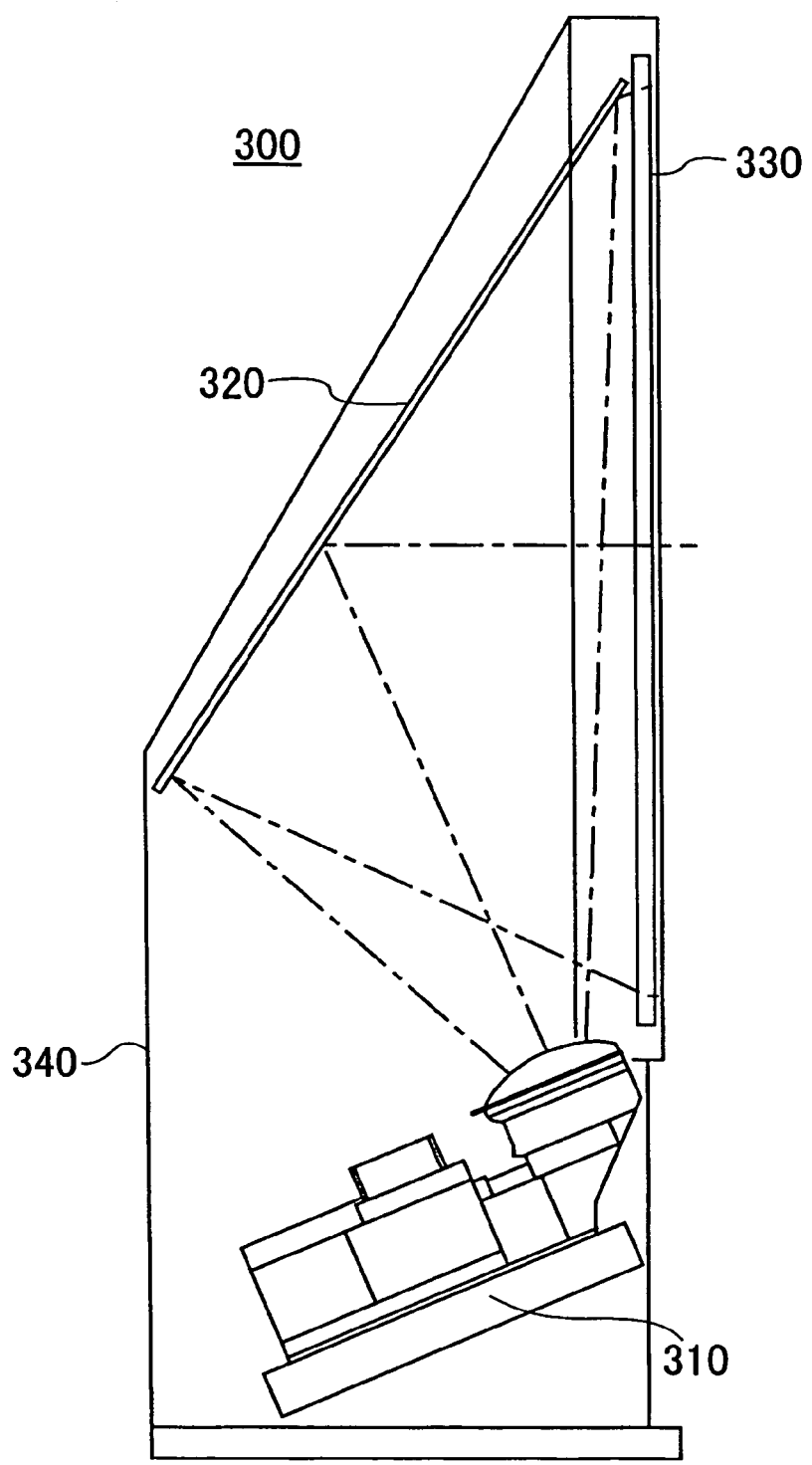
FIG. 13 is a diagram schematically showing a structure of a rear projection of this invention.

FIG. 13 is a diagram schematically showing a structure of the rear projection according to the present invention.

As shown in FIG. 13, a rear projection 300 has a structure in which a projection optical unit 310, a light guiding mirror 320 and a transmission screen 330 are arranged in a casing 340.

Since the rear projection 300 uses the transmission screen 200 which hardly generates diffracted light or moire as described above as its transmission screen 330, it forms an excellent rear projection with a high display quality, which has a wide view angle and free from occurrence of moire.

As described above, in the present invention, since a colored layer 4 is formed by hardening a liquid 42 for forming the colored layer 4 with fluidity after applying the liquid 42 to the troughs 32, it is easy to apply the liquid 42 to the troughs 32 between adjacent microlenses 3 selectively. Further, since the liquid 42 applied to the troughs forms meniscuses, the liquid 42 can suitably adhere to curved surfaces constituting the troughs 32. This makes it possible to enhance the efficiency of formation of the colored layer 4, and to improve adhesion between the colored layer 4 and the resin layer 31 (or troughs 32).

Further, in the method described above, an alignment process for the microlenses 3 becomes unnecessary while forming the colored layer 4. This makes it possible to form the colored layer 4 on the microlens substrate 1 easily and at a lower cost. Thus, it is possible to improve productivity of a microlens substrate 1, whereby it is possible to provide a microlens substrate 1 at a low cost.

In particular, in the case where microlenses 3 are randomly formed on the microlens substrate, it is difficult to form a colored layer 4 on the microlens substrate while aligning the microlenses 3 in the conventional method using the photolithography technology. On the contrary, in the present invention, it is no need to align the microlens substrate 1 on which the microlenses 3 are randomly formed, and it is possible to form the colored layer 4 accurately without misalignment.

Since a portion where the microlenses 3 have not been suitably formed in the manufacturing process for the microlens substrate cannot condense (collect light), the microlens substrate 1 has a flaw that the portion remains as a luminescent spot. In the manufacturing method of the present invention, the liquid 42 for forming a colored layer remains on a portion where the microlenses 3 have not been suitably formed to form the colored layer 4. Thus, since light is intercepted in the portion to darken the portion, it is possible to prevent occurrence of the luminescent spot as mentioned above, and therefore to obscure such a flaw. As a result, it is possible to improve yield of the microlens substrate 1 and to provide the microlens substrates 1 at a low cost.

Further, according to the method of the present invention, it is possible to carry out processes for a large-sized substrate easily and suitably. Accordingly, for example, a substrate with concave portions for large-sized microlenses, a microlens substrate, a transmission screen and a rear projection, each having high quality, can be manufactured by means of a simplified method at a lower cost.

As described above, it should be noted that, even though the method of forming a colored layer on a microlens, the microlens substrate, the transmission screen and the rear projection according to the present invention have been described with reference to the preferred embodiments shown in the accompanying drawings, the present invention is not limited to these embodiments.

For example, in the method of forming a colored layer on a microlens according to the present invention or method of forming the substrate with concave portions, any process for another arbitrary object may be added if necessary.

Further, in the above description for the method of manufacturing the substrate with concave portions, the method of forming the concave portions for microlenses by forming the initial holes on the mask formed on the surface of the substrate by means of the physical method or the irradiation with laser beams in the method of forming the colored layer on the microlens substrate, and then carrying out the etching process has been described as the example. However, the method of forming the concave portions for microlenses by forming the openings on the mask formed on the surface of the substrate by means of the photolithography technology or the like, and carrying out the etching process may be utilized.

Further, in the initial hole formation process in the above description, the structure in which shot blast is carried out while moving the nozzle 20 one-dimensionally (in a linear manner) has been described. However, the blast processing may be carried out while moving the nozzle 20 two-dimensionally (in a planar manner) or three-dimensionally (in a spatial manner).

Moreover, in the above description, the method of manufacturing a microlens substrate by means of the 2P method has been described. However, the microlenses may be manufactured by means of any method other than the 2P method.

Furthermore, in the above description, the case where the liquid for forming a colored layer adhering on the effective lens region of each of the microlenses is removed before hardening the liquid has been described. However, such the liquid may be removed after hardening the liquid for forming a colored layer, if necessary.

Further, in the above description, the plano-convex microlenses have been described as the microlenses 3 on the microlens substrate 1, but the microlens is not limited to this type. For example, biconvex microlenses constituted by gluing two pieces of microlens substrate with plano-convex microlenses together so that the plane surface side of one microlens substrate faces to that of the other microlens substrate may be utilized.

Moreover, the transmission screen and the rear projection according to the invention are not limited to the types as described in the embodiments, and each element constituting the transmission screen and the rear projection may be replaced with one capable of performing the same or a similar function. For example, the transmission screen of the invention may be a transmission screen further including black stripes, a light diffusion plate or any other microlens substrate on the emission face side of the microlens substrate 1.

Furthermore, in the above description, the cases of applying the microlens substrate of the invention to the transmission screen and the projection display provided with the transmission screen have been described as the examples, but the present invention is not limited to these cases. For example, needless to say, the microlens substrate of the invention may be applied to a CCD, various kinds of electro-optical devices such as an optical communication device, a liquid crystal display (liquid crystal panel), an organic or inorganic electroluminescent (EL) display and other devices.

In addition, the display is also not limited to the rear projection type display, and the microlens substrate of the invention can be applied, for example, to a front projection type display.

EXAMPLE

Example 1

A substrate with concave portions for microlenses equipped with concave portions for microlenses was manufactured, and then a microlens substrate was manufactured using the substrate with concave portions for microlenses in the following manner.

First, an alkali-free glass substrate having a rectangle of 1.2 m×0.7 m and a thickness of 0.7 mm was prepared.

The substrate of alkali-free glass was soaked in room-temperature cleaning liquid (i.e., 4 wt % aqueous solution of ammonium hydrogen difluoride) to be washed, thereby cleaning its surface.

-1A- Next, chromium or chromium oxide film (a mask) having a thickness of 0.15 µm were formed on the alkali-free grass substrate by means of a sputtering method.

-2A- Next, laser machining was carried out to the mask to form a large number of initial holes within a region of 113 cm×65 cm at the central part of the mask.

In this regard, the laser machining was carried out using a YAG laser under the conditions of energy intensity of 2 mW, a beam diameter of 5 µm, and an irradiation time of 0.1 msec.

In this way, the initial holes were formed in a random pattern over the entire region of the mask mentioned above. The average diameter of the initial holes was 5 m, and the formation density of the initial holes was 20,000 holes/cm$^2$.

In addition, at this time, initial concave portions each having a depth of about 0.1 µm were formed on the surface of the alkali-free glass substrate.

-3A- Next, the soda-lime glass substrate was subjected to a wet etching process, thereby forming a large number of concave portions on the alkali-free glass substrate.

In this regard, 4 wt % aqueous solution of ammonium hydrogen difluoride (at room temperature) was used for the wet etching as an etchant, and the soak time of the substrate was 12 hours.

-4A- Next, the chromium or chromium oxide film (the mask) was removed by soaking the alkali-free glass substrate in an aqueous solution of a mixture of ceric ammonium nitrate and perchloric acid for thirty minutes.

As a result, a wafer-like substrate with concave portions for microlenses where a large number of concave portions for microlenses were randomly formed on the alkali-free glass substrate was obtained.

By using the substrate with concave portions for microlenses manufactured as described above, a microlens substrate is manufactured by means of the 2P method.

-5A- The substrate with concave portions for microlenses was set so as to have the concave portions open vertically upward. Uncured epoxy-based resin was supplied on the substrate with concave portions for microlenses. Then, the glass substrate was joined to the uncured epoxy-based resin, and the glass substrate was made to be closely contacted with the uncured epoxy-base resin by pressing.

-6A- Next, the epoxy-based resin was cured (or hardened). In this way, the microlenses were formed from the resin filled in the concave portions.

-7A- Next, the substrate with concave portions for microlenses functioning as the mold was removed from the microlenses, and the glass substrate is set so that the microlenses face vertically upward.

Next, a colored layer was formed in the troughs between adjacent microlenses.

The formation of the colored layer is carried out as follows.

-8A- First, a liquid for forming a colored layer (i.e., dispersion liquid) was fabricated by diluting black paint (TAMIYA color XF1 made by TAMIYA, in this example) with equal amount of water. In this case, the black paint was an acrylic paint. Further, the coefficient of viscosity of the liquid for forming a colored layer was 5 cP at the room temperature of 25° C. Moreover, the optical density of the liquid was 2.0 in the case where the wavelength of light was 587.56 nm. An average grain diameter of the pigment contained within the liquid for forming a colored layer was 5 μm.

9A- Next, the liquid for forming a colored layer was applied onto the microlenses by spraying the liquid thereon. A contact angle of the liquid to the microlenses (i.e., microlens substrate) was 25° during the application of the liquid.

-10A- Next, the liquid adhering to the effective lens regions of the microlenses was removed by spraying compressed air to the entire substrate.

-11A- Next, the microlens substrate was desiccated by leaving it at room temperature for a day at the state where the microlenses of the microlens substrate face upward. Thus, the solvent or the dispersion medium was removed from the liquid for forming a colored layer, whereby the colored layer was formed on the troughs between adjacent microlenses.

In this way, a microlens substrate with an area of 1.2 m×0.7 m on which a large number of microlenses were randomly formed and a colored layer was formed was obtained. The average diameter of the formed microlenses was 110 μm. Further, the optical density of each of the microlenses was 0.2 in the case where the wavelength of light was 587.56 nm.

Comparative Example

The -1A- to -4A- processes mentioned above were carried out, so that a substrate with concave portions for microlenses was obtained similar to Example 1.

-1B- Next, a cover glass was bonded to the surface on which the concave portions of the substrate with concave portions for microlenses were formed using an ultraviolet-ray (UV) curing epoxy-based optical adhesive (with index of refraction of 1.59).

In this way, microlenses constituted from the optical adhesive filled in the concave portions of the substrate with concave portions for microlenses were formed in a resin layer constituted from the cured optical adhesive.

-2B- Next, the bonded cover glass was grinded and polished so that the thickness of the cover glass was 50 μm.

-3B- Next, a black matrix having openings was formed on the cover glass. This was carried out as follows. First, a chromium layer with a thickness of 0.16 μm was formed (by carrying out deposition) on the cover glass by means of sputtering. Then, a resist layer was formed on the chromium layer. A black matrix pattern was formed on the resist layer by exposing the cover glass by means of an exposure device so that each opening of the black matrix pattern corresponded with an optical axis of each of microlenses using alignment marks (a detail description thereof was omitted) as the indices. Next, openings of the black matrix was formed on the chromium layer by carrying out an etching process using a mixture of ceric nitrate ammonium and hydrogen peroxide as a release liquid. Next, the resist layer was removed.

In this way, a microlens substrate with an area of 1.2 m×0.7 m on which a large number of microlenses were randomly formed and the black matrix was formed was obtained. The average diameter of the formed microlenses was 116 μm.

(Evaluation)

In Example in which a colored layer was formed by applying a liquid for forming a colored layer on troughs between adjacent microlenses and hardening the liquid, a colored layer could be formed on a microlens substrate on which microlenses were randomly arranged, accurately and without misalignment. Further, a processing for a large-sized substrate such as 1.2 m×0.7 m could be also implemented easily. Moreover, the colored layer formed in the present embodiment has a function of absorbing outer light.

On the other hand, in the comparative example in which a black matrix was formed by a photolithography method, it was very difficult to form the black matrix while aligning the microlenses randomly formed on the substrate. Further, it is difficult to implement a processing for a large-sized substrate such as 1.2 m×0.7 m. In particular, since numerous defective products were generated in the photoresist process, the yield was extremely inferior.

Using the microlens substrates obtained by Example 1 described above, transmission screens as shown in FIGS. 11 and 12 were manufactured, and the rear projection as shown in FIG. 13 was manufactured using the transmission screens.

When an image was projected onto a screen of the rear projection obtained, a bright image could be displayed. Further, in the rear projection using the microlens substrate according to Example 1, it was confirmed that the contrast was improved, the view angle was widened, and occurrence of diffracted light or moire was satisfactorily prevented.

Accordingly, it is readily conjectured that a projection display using such a transmission screen is capable of projecting a bright image of high quality on the screen.

The entire disclosure of Japanese patent application No. 2003-161295 filed Jun. 5, 2003 is hereby incorporated by reference.

The invention claimed is:

1. A method of manufacturing a microlens substrate on which a colored layer is formed, the method comprising the steps of:
   preparing a substrate provided with a plurality of concave portions, the plurality of concave portions being arranged on the substrate in an optically random order;
   filling an uncured resin in the plurality of concave portions;
   curing the resin while a base is made to be closely contacted with the uncured resin;
   removing the substrate from the cured resin to obtain a microlens substrate provided with a plurality of microlenses;
   applying a colored liquid having fluidity onto the side of the microlens substrate where the plurality of microlenses and a plurality of troughs formed between adjacent microlenses are provided;
   hardening the applied colored liquid to form the colored layer in the troughs of the microlens substrate; and
   removing the base from the microlens substrate.

2. The method as claimed in claim 1, wherein the colored liquid has a coefficient of viscosity of 500 cP or less at a temperature of 25° C.

3. The method as claimed in claim 1, wherein a contact angle of the colored liquid to the microlens substrate is less than 90° during the application of the colored liquid.

4. The method as claimed in claim 1, wherein the colored liquid has a predetermined optical density for light having a predetermined wavelength, and wherein the optical density of the liquid is higher than that of each of the microlenses when the wavelength of the light is 587.56 nm.

5. The method as claimed in claim 1, wherein each of the microlenses has an effective lens region, and the method further comprising the step of:

removing the colored liquid or the solid of the colored liquid adhering to portions corresponding to the effective lens regions of the microlenses.

6. The method as claimed in claim 1, wherein the colored liquid is applied to the microlens substrate by means of a spray method.

7. The method as claimed in claim 1, wherein the colored liquid is in the form of a solution containing a solvent or a dispersion liquid containing a dispersion medium wherein the hardening of the colored liquid is carried out by removing the solvent or the dispersion medium from the liquid.

8. The method as claimed in claim 7, wherein at least one pigment is dispersed in the dispersion medium of the dispersion liquid.

9. The method as claimed in claim 8, wherein an average grain diameter of the pigment is in the range of 0.03 to 20 µm.

10. The method as claimed in claim 1, wherein the colored layer has a function of improving the contrast when light enters the microlens substrate.

11. A microlens substrate manufactured using the method defined by claim 1.

12. A transmission screen comprising the microlens substrate defined by claim 11.

13. The transmission screen as claimed in claim 12, further comprising a Fresnel lens portion with a Fresnel lens, the Fresnel lens portion having an emission face and the Fresnel lens being formed in the emission face thereof wherein the microlens substrate is arranged on the emission face side of the Fresnel lens portion.

14. The transmission screen as claimed in claim 12, wherein the diameter of each of the microlenses is in the range of 10 to 500 µm.

15. A rear projection apparatus comprising the transmission screen defined by claim 12.

16. The rear projection apparatus as claimed in claim 15, further comprising:

a projection optical unit; and a light guiding mirror.

* * * * *